United States Patent [19]

Ichikawa et al.

[11] Patent Number: 5,612,792
[45] Date of Patent: Mar. 18, 1997

[54] IMAGE PROCESSING METHOD AND APPARATUS FOR OUTPUTTING A PATTERN IMAGE IN ACCORDANCE WITH THE COLOR AND DENSITY LEVEL OF EACH COLOR OF THE OUTPUT POLYCHROMATIC IMAGE

[75] Inventors: Hiroyuki Ichikawa, Kawasaki; Hiroshi Ohmura, Inagi; Shizuo Hasegawa, Tokyo; Keizo Isemura, Kokubunji; Yoshinobu Aiba, Kawasaki, all of Japan

[73] Assignee: Canon Kabushiki Kaisha, Tokyo, Japan

[21] Appl. No.: 664,934

[22] Filed: Mar. 5, 1991

[30] Foreign Application Priority Data

Mar. 5, 1990 [JP] Japan ................................. 2-51644
Jul. 30, 1990 [JP] Japan ................................. 2-199182

[51] Int. Cl.⁶ ..................................................... H04N 1/56
[52] U.S. Cl. ............................................ 358/500; 358/530
[58] Field of Search ........................... 358/75, 80, 296, 358/298, 500, 501, 502, 503, 504, 505, 506, 507, 508, 509, 511, 512, 513, 518, 515, 521, 522, 530, 455; 346/157; 382/17, 165, 162; 395/109

[56] References Cited

U.S. PATENT DOCUMENTS

| | | | |
|---|---|---|---|
| 4,369,461 | 1/1983 | Tamura | 358/501 |
| 4,688,031 | 8/1987 | Haggerty | 358/459 |
| 4,926,253 | 5/1990 | Nakashima et al. | |
| 4,958,217 | 9/1990 | Kimura et al. | |
| 5,021,876 | 6/1991 | Kurita | |
| 5,053,888 | 10/1991 | Normura | 358/455 |
| 5,091,789 | 2/1992 | Haneda et al. | |
| 5,208,663 | 5/1993 | Hiratsuka | 358/500 |
| 5,365,352 | 11/1994 | Tajima | 358/500 |

FOREIGN PATENT DOCUMENTS

| | | | |
|---|---|---|---|
| 3802736 | 8/1988 | Germany | H04N 1/46 |
| 278469 | 11/1988 | Japan | H04N 1/46 |

OTHER PUBLICATIONS

P. Heckbert, "Color Imgae Quantization For Frame Buffer Display," Computer Graphics (Jul. 1982), pp. 297–307.

"Technical Report of Institute of Electronics and Communication Engineers," Image Optics IE 86-4 (1986), pp. 25–30.

MDEP Fifth Edition, Aug. 1983 Publication by Patent trademark office.

*Primary Examiner*—Scott A. Rogers
*Attorney, Agent, or Firm*—Fitzpatrick, Cella, Harper & Scinto

[57] ABSTRACT

An image processing method, and corresponding apparatus, includes the steps of discriminating the color type of an input color image from an input color image signal, generating a pattern signal indicating a predetermined graphic pattern corresponding to the color type in response to the color discrimination, generating a density signal in accord with the input color image signal, and supplying a reproduction signal in accord with the pattern signal and the density signal to an image reproduction unit.

17 Claims, 26 Drawing Sheets

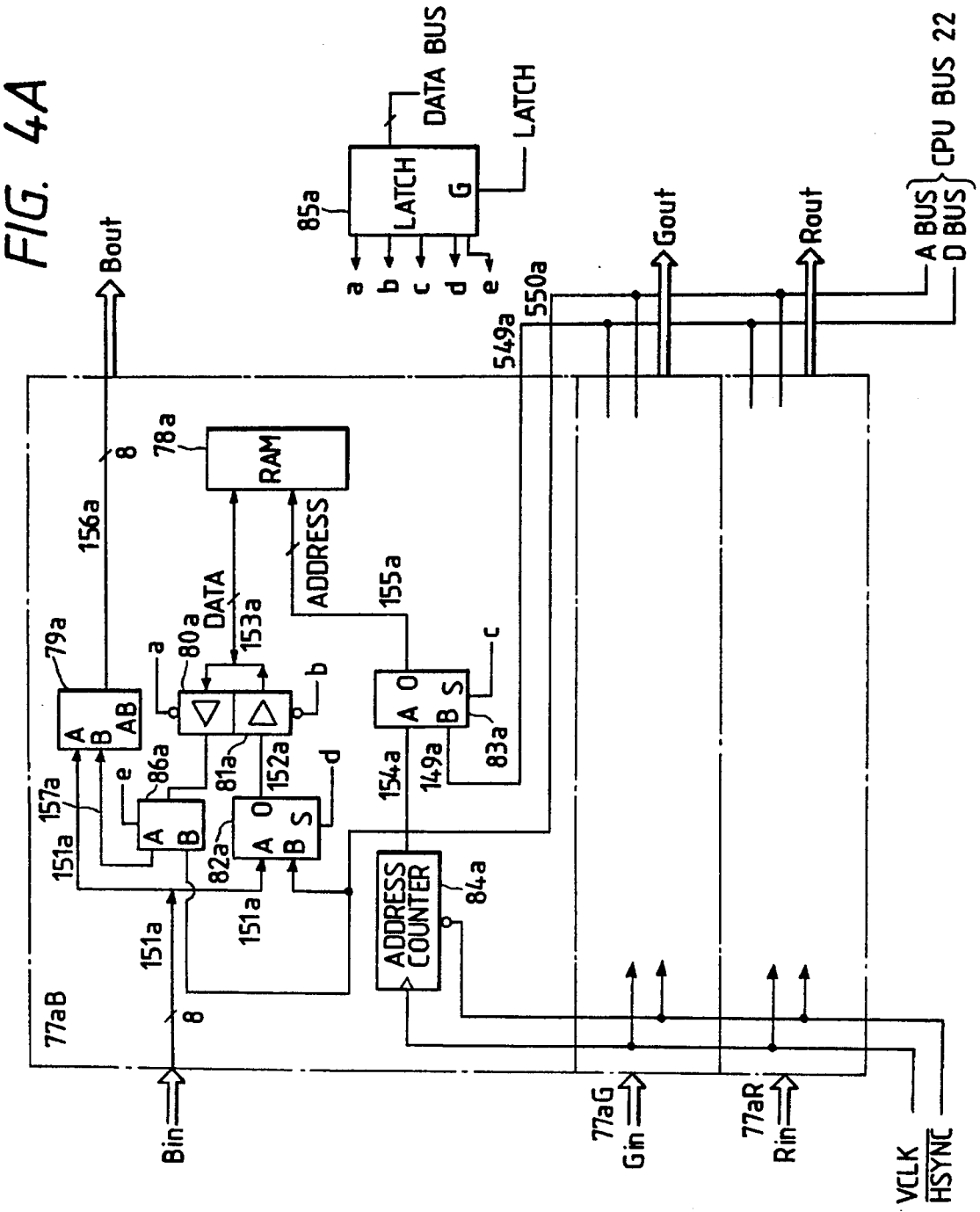

FIG. 9
RED : 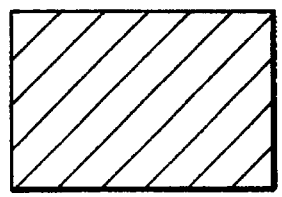
YELLOW : 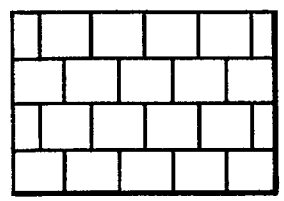
BLUE : 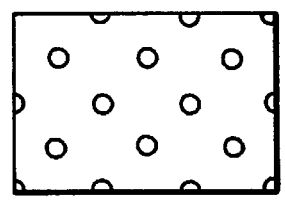
GREEN : 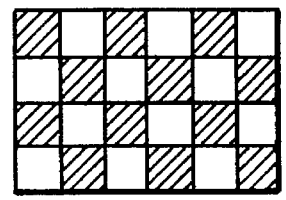
BROWN : 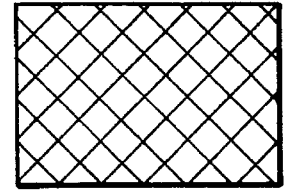
ORANGE : 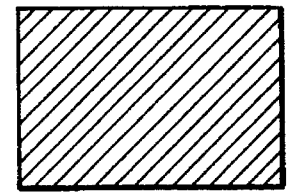

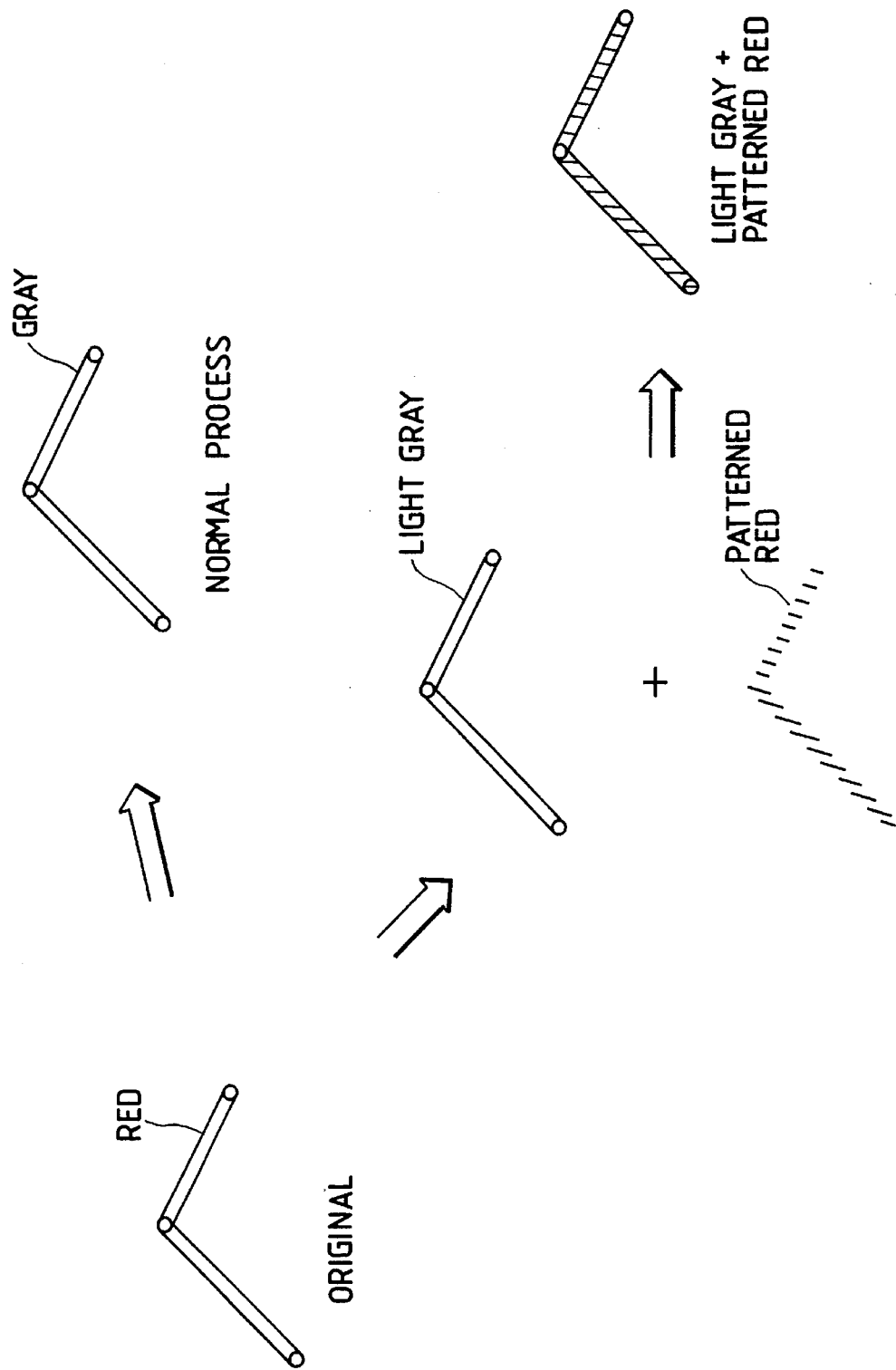

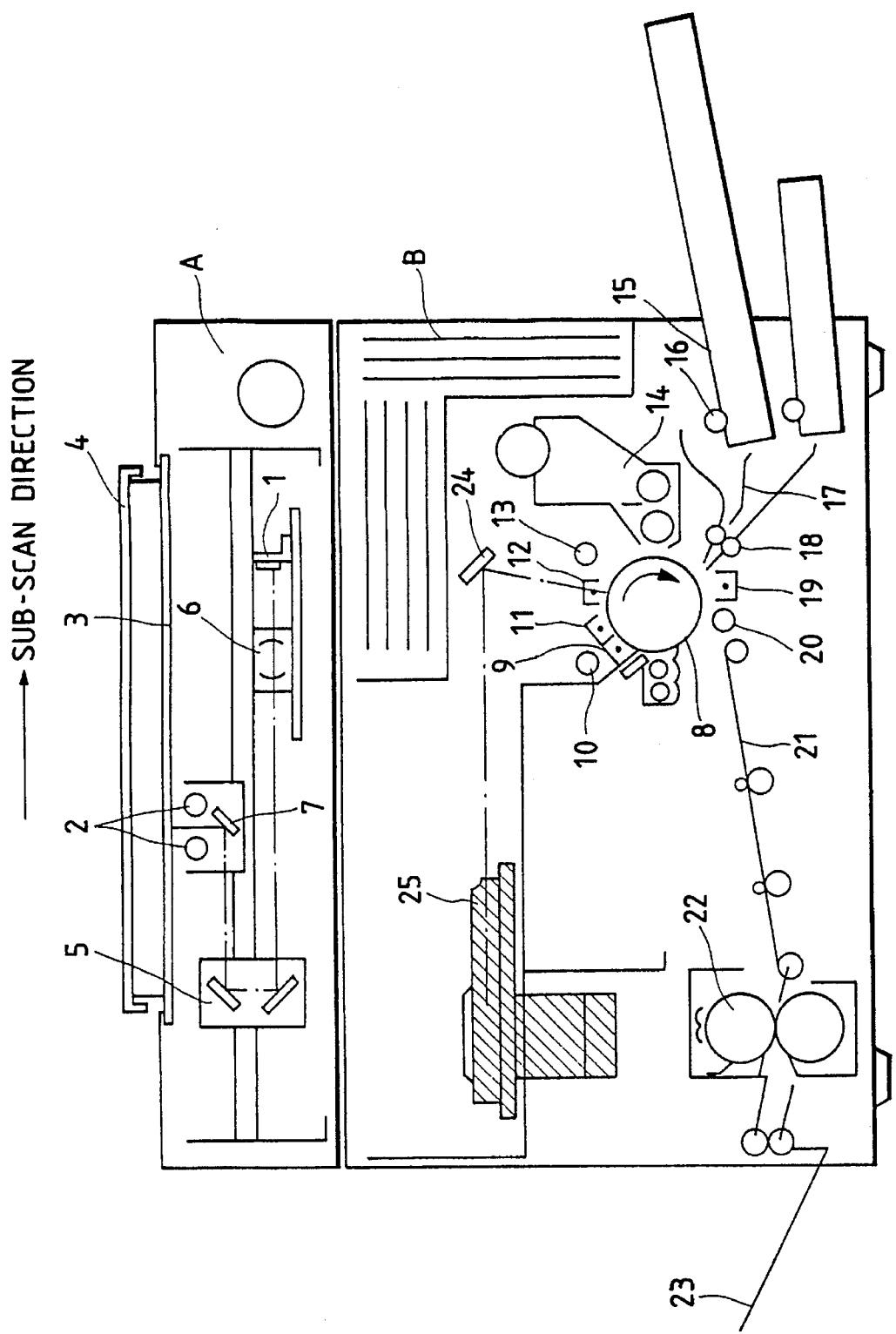

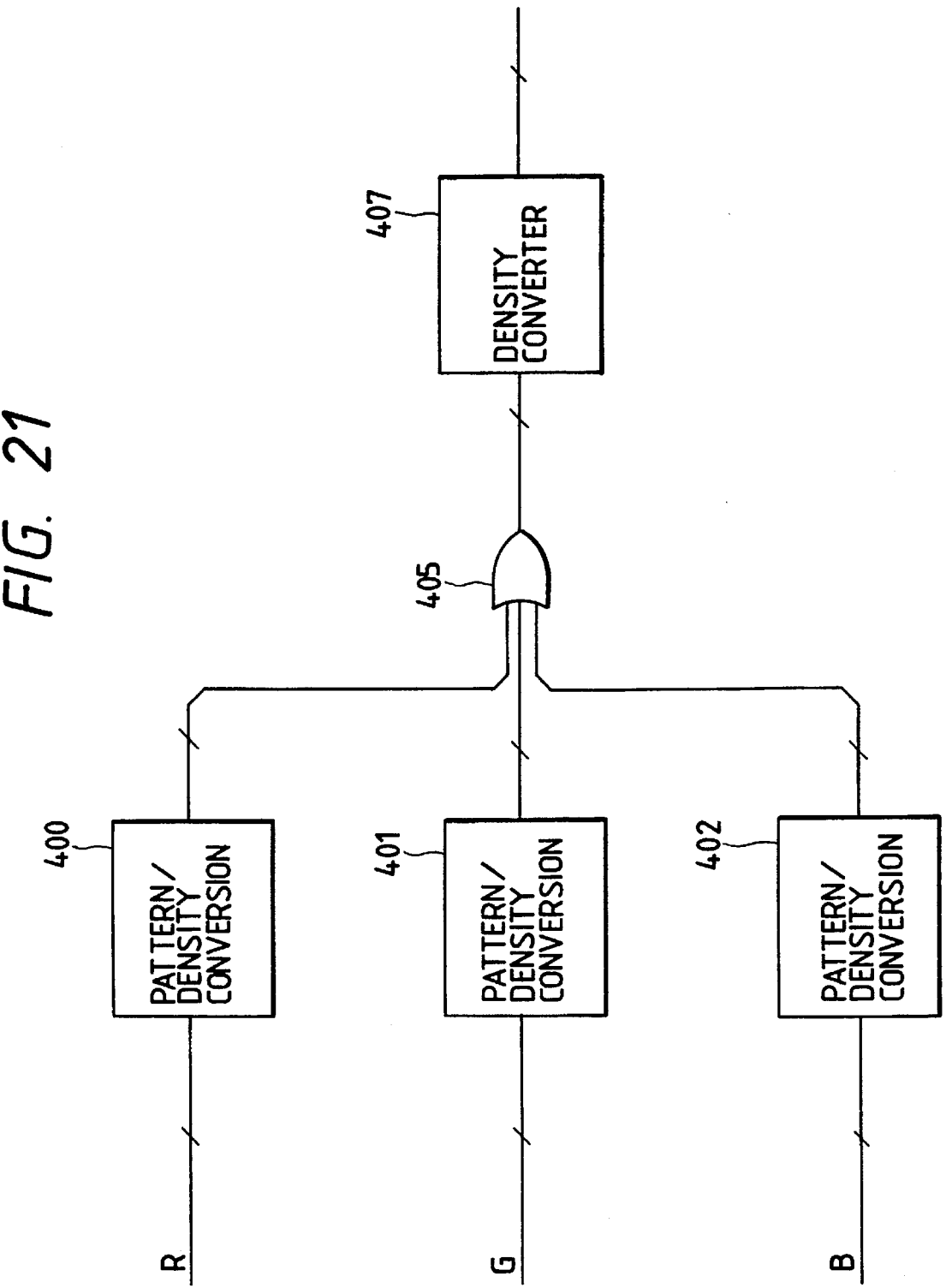

IMAGE PROCESSING METHOD AND APPARATUS FOR OUTPUTTING A PATTERN IMAGE IN ACCORDANCE WITH THE COLOR AND DENSITY LEVEL OF EACH COLOR OF THE OUTPUT POLYCHROMATIC IMAGE

BACKGROUND OF THE INVENTION

1. Field of the Invention

The present invention relates to an image processing method and apparatus, and particularly, to an image processing apparatus such as image scanner, printer, digital copying machine, and facsimile terminal equipment, or an image processing apparatus used in connection with the image processing apparatus as above cited, and an image processing method thereof.

2. Related Background Art

Conventionally, a digital copying machine, for example, is constituted in such a way that an original is illuminated by a light source such as a tungsten-halogen lamp, the reflected light from the original is converted into electric signals using solid image sensors such as CCDs (charge coupled device), and then converted into digital signals, and after a predetermined correcting process, the resulting signals are used to form a recorded image with a recording apparatus such as laser printer, liquid crystal printer, thermal printer, ink jet printer, etc.

In such a digital copying machine, an output containing a large quantity of information is required when a colored original is copied, and so a copying machine has been recently developed, which uses a polychromatic laser beam printer provided with developer devices for a multiplicity of colors so that variable color copy can be realized.

However, the above-mentioned copying machine, which is provided with developer devices for a multiplicity of colors to form an image with variable colors, is complex in construction due to the multiplicity of developer devices provided thereon, and is expensive because a high accuracy in registration of images is required. This is also the problem with the copying machine using a polychromatic ink jet printer.

In the formation of image requiring the transfer of information in a monochromatic facsimile or the like, an original is read with photoelectric elements such as solid image sensors, and an image is formed based on thus converted electric signals in time-series. And in forming the image, it was commonly practiced that the gradation (or density level) of an original was only sensed without discriminating the color.

However, in the case where there are some colored drawings or tables in an original, a photoelectric converted signal only shows density level for different colors, and as most colors represented on the original are usually deep, density signals are often caused to be almost equal so that the colored portions can not be distinguished from each other in reproduction.

In a reproduced image, black portions of an original can be completely reproduced, but gray portions of the original and colored drawings or tables are represented only by gray, so that the distinction therebetween becomes quite difficult.

Thus, an invention intended to reproduce distinguishably a plurality of images with different colors contained in an original is disclosed in U.S. Pat. No. 4,369,461 specification.

However, in a situation where full-color originals are abundant, the above-described invention is not applicable to patterns containing the number of different colors contained in an original subject. Therefore methods of selecting limited number of colors have been proposed.

For example, they are methods of simply selecting limited colors from an upper level of histogram, as described in Computer Graphics Vol. 16 (1982), No. 3, pp. 297–307; or investigating an axis where colors are most widely distributed over the color space, dividing the color space at an intermediate value in a range of distribution with respect to the axis, thus obtaining a limited number of partial spaces, to each of which the same processing is repeated, and thereby selecting an average color in each partial space; or dividing the color space into small partial spaces, repeating the clustering of partial spaces under a certain condition, obtaining a limited number of partial spaces, and selecting a color with the highest frequency in each partial space, as mentioned in Image Optics, IE86-4 (1986, pp. 25–30), the technical report of the Institute of Electronics Information and Communication Engineers.

Thus, multicolor images can be monochromatically represented by designating different patterns to those selected colors.

However, in the above conventional examples, as different patterns are designated to selected colors, respectively, similar colors may have different patterns. Thereby, there is a disadvantage that as a full-color original may be constructed with many different patterns.

Further, in an area with moderately changing color, the boundaries of partial areas are made distinct owing to the differences of patterns, so that the information of "moderately" changing is lost. Therefore, there was also a disadvantage that pseudo contours might arise due to distinct boundaries.

SUMMARY OF THE INVENTION

It is an object of the present invention to provide an image processing method and apparatus which has eliminated the above-mentioned disadvantages.

An object of an embodiment according to the present invention is to provide an image processing apparatus with which an output image can be obtained using an inexpensive monochromatic printer and without spoiling the amount of color information contained in an original image.

To accomplish the above objects, the embodiment of the present invention is characterized by comprising color discriminating means for discriminating the color of an input image from an input color image signal, pattern generator means for generating a predetermined graphic pattern corresponding to each color in accord with a color discrimination signal of the color discriminating means, brightness signal generator means for generating a brightness signal from the input color image signal (wherein the brightness signal indicates brightness of an image, that is, an image component other than color components of an image represented by the color image signal), and pattern synthesis means for synthesizing and outputting the graphic pattern and the brightness signal.

Another embodiment of the present invention is characterized in that the signal synthesis means synthesizes the brightness signal that is made lighter in density and the graphic pattern.

Another embodiment of the present invention is constituted such that the graphic patterns each corresponding to predetermined color information are prestored in pattern generator means consisting of RAM or ROM, and the pattern generator means generates a predetermined graphic pattern, based on the color information for each pixel of an image signal input from image sensors or the like, whereby an output image with patterns is obtained by a printer. Accordingly, as the output image is represented with a single color in which a plurality of color informations are represented using graphic patterns, an inexpensive monochromatic printer can represent the output image without losing the amount of color information contained in an original image.

Another embodiment of the present invention is to resolve the above problems, and it is an object of the invention to provide an image reproduction apparatus capable of reproducing recognizably a multiplicity of images with different colors contained in an original.

To accomplish the above object, an image reproduction apparatus according to an embodiment of the present invention reproduces a polychromatic image by reading the image and selecting a predetermined pattern and density corresponding to each color image. The apparatus includes read means for reading the polychromatic image, setting means for setting a predetermined pattern and density corresponding to each color image read by said read means, and image reproduction means for reproducing the image based on the patterns and densities set by the setting means.

Further, in a predetermined embodiment of the invention, the setting means includes discrimination means for discriminating whether or not an image is non-color, and selection means for selecting non-color data if the result of the discrimination means is non-color, and wherein the setting is made depending on the result of the selection means.

The above constitution operates by reading a polychromatic image, setting a predetermined pattern and density corresponding to each color image being read, and reproducing the image based on the patterns and densities being set.

Other objects of the present invention will become apparent from the following description taken in conjunction with the drawings.

BRIEF DESCRIPTION OF THE DRAWINGS

FIGS. 2A-1/2A-2 and 2B are a configuration view and a timing chart for showing the color read sensors as shown in FIG. 1 and driving pulses, respectively.

FIGS. 4A and 4B-1/4B-2 are a block diagram and a conceptual view showing the detail of a black correction circuit as shown in FIG. 1 and the black correction operation, respectively.

FIG. 9 is views showing one example of the color-pattern correspondence generated in the pattern generator circuit as shown in FIG. 8.

FIG. 11-1/11-2 are views showing a color-pattern conversion sample according to an example of the present invention.

FIG. 12 is views for explaining the difference between normal process and pattern output process operations of the present example.

FIG. 13B is a structual cross-sectional view of the image copying machine according to the second example of the present invention.

FIG. 21 is a block diagram showing the constitution of a pattern density processor according to another example.

DETAILED DESCRIPTION OF THE PREFERRED EMBODIMENTS

An example of the present invention will be described with reference to the drawings.

Overall configuration

Figure 1:
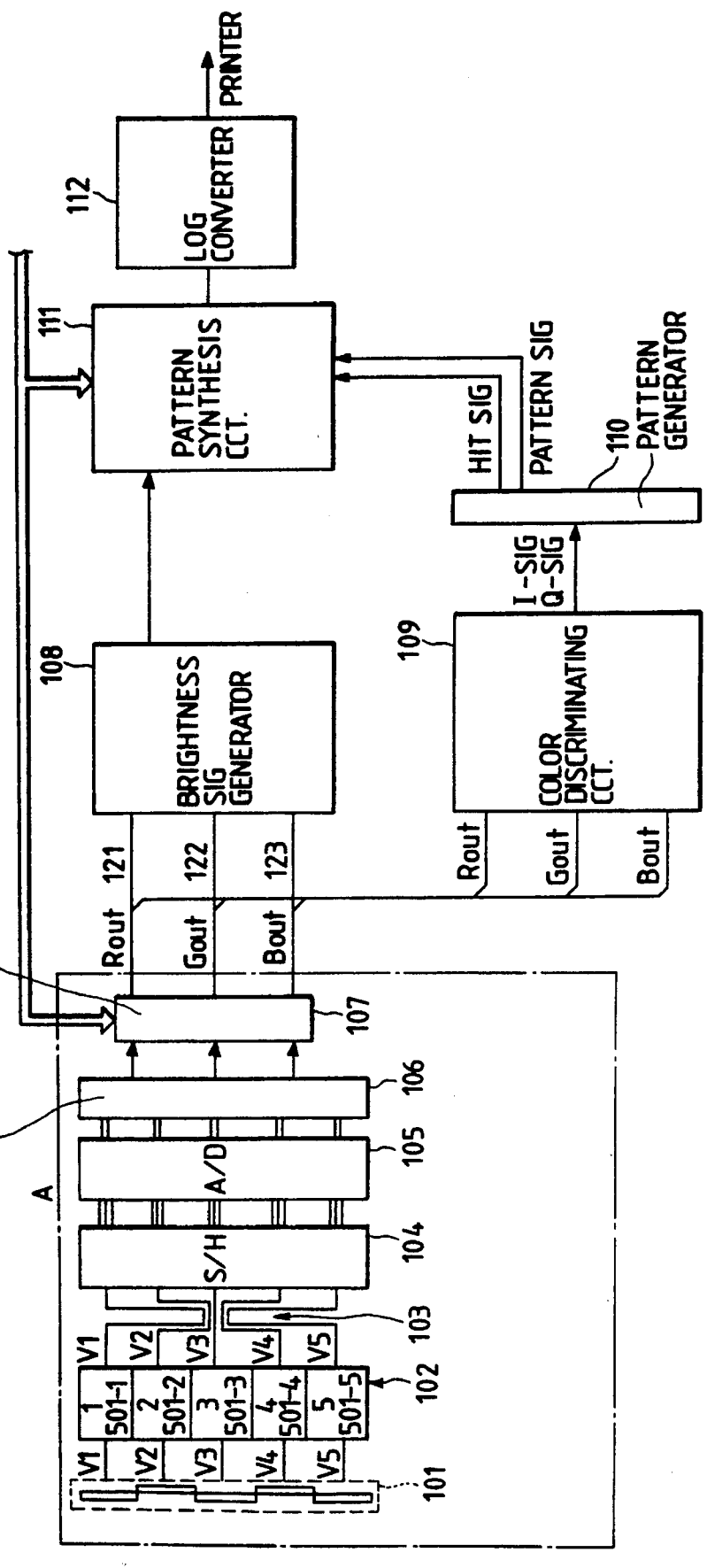
FIG. 1 is a block diagram showing a general circuit configuration of an image processing apparatus in a digital copying machine, according to one example of the present invention.

FIG. 1 shows an example of the circuit configuration for an image copying apparatus in a digital copying machine to which the present invention is applied. In FIG. 1, 101 a CCD (charge coupled device), i.e. an image sensor (color reading sensor), of image pickup means for converting a color original image formed by an optical system such as rod lens into electrical signals of G (green), B (blue) and R (red), and which comprises a color separation filter. 102 is an amplifier circuit for amplifying an output singal of CCD 101, 103 is a coaxial cable, and 104 is a sample-and-hold (S/H) circuit for sampling and holding (S/H) a color image signal via the coaxial cable 103 from the amplifier circuit 102 to separate it into three colors of G, B and R. 105 is an analog-to-digital (A/D) conversion circuit for converting an analog color image signal sampled and held in the sample-and-hold circuit 104 into digital color image signals, 106 is a reading position difference correction circuit for electrically correcting a reading position difference between channels of CCD 101, and 107 is a black correction/white correction circuit for applying the black and white level corrections (shading correction), as will be described later, to digital image signals.

108 is a brightness signal generator to generate a brightness signal from a digital color image signal to which the black and white corrections have been applied. 109 is a color discriminating circuit for discriminating the color for each pixel of a digital color image to which the black and white corrections have been applied and for outputting a color discriminating signal corresponding to the color-difference signals I, Q. 110 is a pattern generator circuit comprised of a storage-device such as RAM or ROM, for generating predetermined graphic patterns corresponding to each pixel, based on a color discriminating result (I, Q signals) of the color discriminating circuit 109. In this example, the pattern generator circuit 110 reads and outputs one of predetermined graphic patterns, with a color discriminating signal corresponding to the level of the color-difference signals, I, Q being as a read address.

111 is a pattern synthesis circuit for synthesizing a brightness signal generated in the brightness signal generator 108 and a graphic pattern indicating the color which is generated by the pattern generator circuit 110. 112 is a LOG converter for converting an output signal of the pattern synthesis circuit 111 to a density signal to be output to various printers connected thereto. Note that a portion A encompassed by the chain line corresponds to a video image process circuit of an image reading apparatus (image sensor).

An image copying apparatus of this example exposes a full-color original to a light source such as a (tungsten) halogen lamp or fluorescent lamp, not shown, picks up a reflected color image with color image sensors such as CCDs, digitizes an analog image signal obtained by an A/D converter or the like, processes digital full-color image signals, and outputs them to a thermal printer, an ink jet printer, or a laser beam printer, for forming the image. The detail thereof will be described below.

Color reading sensor

First, an original is illuminated by an exposure lamp, not shown, and then a reflected light is color-separated for each image and, read by a color reading sensor 101 and amplified to a predetermined level by an amplifier circuit 102. Here, the drive of CCD 101 has been made by a system pulse generator, not shown.

Figures 1, 2, 2A:
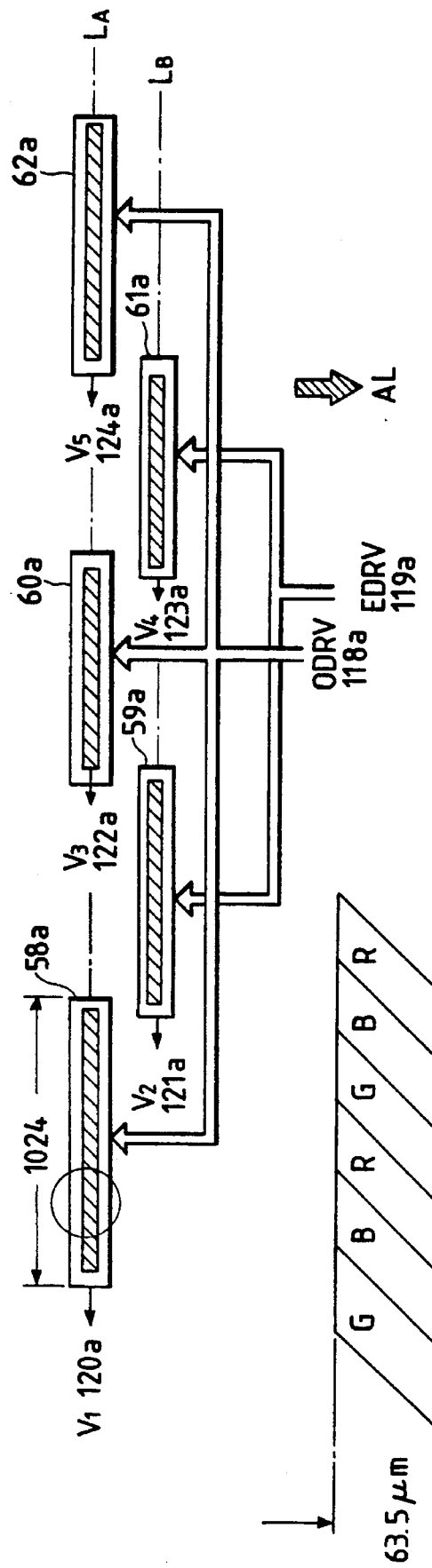

FIGS. 2 A-1/2A-2 and 2B show the color reading sensor and the driving pulses. FIG. 2A-1 shows the color reading sensor as used in this example, which uses 63.5 μm as one pixel (400 dot/inch (thereafter referred to as dpi)), and has a total of 1024 pixels, or a total 1024×3=3072 effective pixels because of three divisions G, B and R contained in one pixel in the main scanning direction as shown, thereby reading with five divisions in the main scanning direction. On the other hand, each chip 58–62 of this sensor (shown in FIG. 2A-1) is formed on the same ceramic substrate, where first, third and fifth chips (58a, 60a, 62a) are placed on the same line LA, while second and fourth chips are placed on the line LB separated away from the line LA by four lines (63.5 μm×4=254 μm), and when reading an original, the scanning is made in the AL direction.

Among five CCDs, first, third and fifth CCDs are driven by a group of driving pulses ODRV118a, while second and fourth CCDs are driven by a group of driving pulses EDRV119a, independently and synchronously. Pulse signals Oφ1A, Oφ2A and ORS contained in the group of driving pulses ODRV118a and pulse signals Eφ1A, Eφ2A and ERS contained in the group of driving pulses EDRV119a are the electric charge transfer clock and charge reset pulses within the respective sensors, and are generated synchronously to avoid the jitters caused by interferences or noises between first, third, fifth CCDs and second, fourth CCDs. Thereby, these pulses are generated by a reference oscillator, not shown.

Figure 3A:
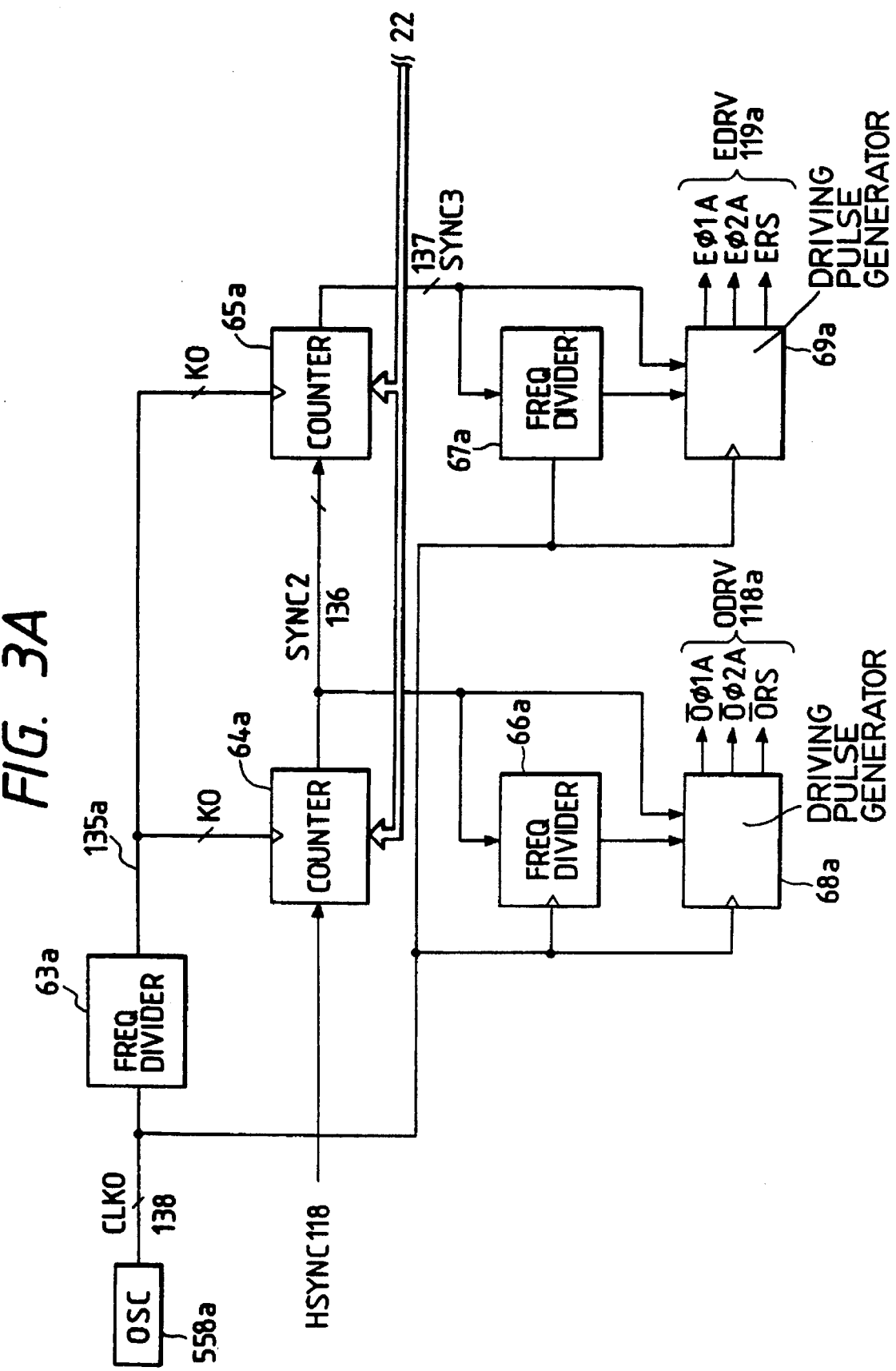
FIGS. 3A and 3B are a block diagram and a timing chart for showing a CCD driving pulse generator circuit and CCD driving pulses, respectively, to generate sensor driving pulses ODRV118a and EDRV119a as shown in FIG. 2.
Figure 3B:
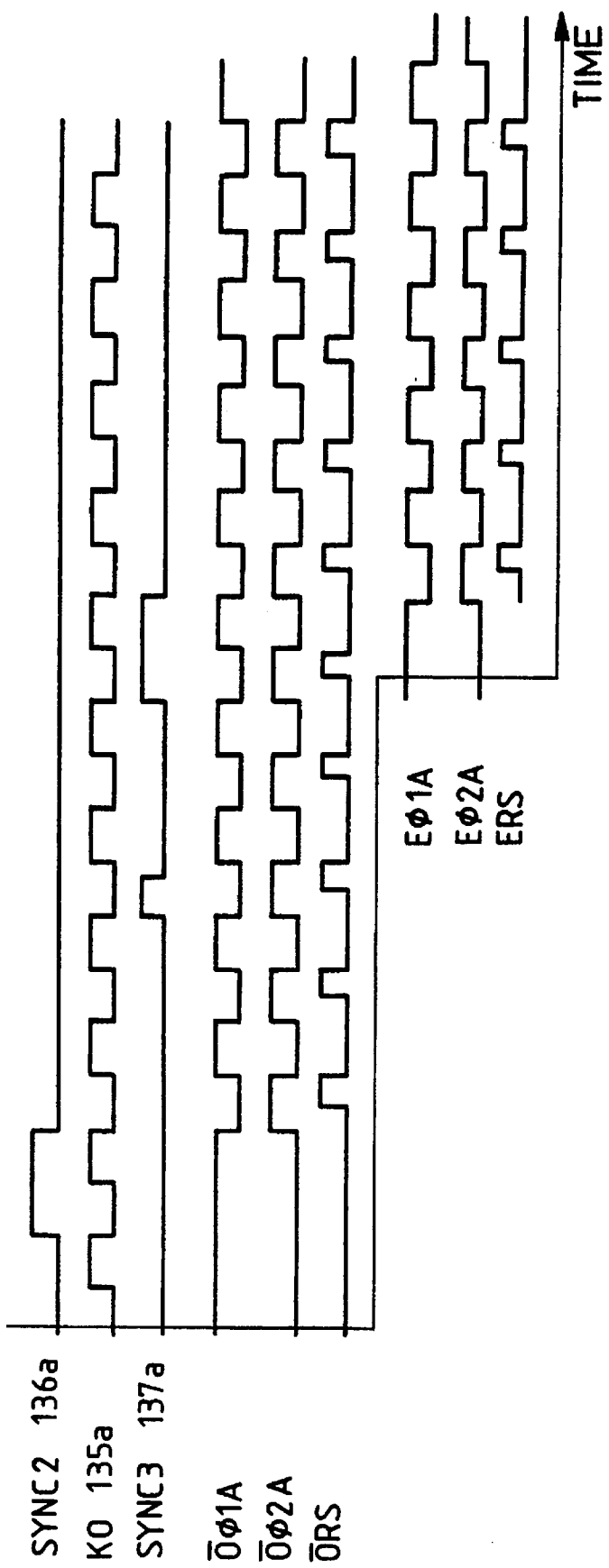

FIG. 3A shows a circuit block for generating the group of driving pulses ODRV118a, EDRV119a as above described, and FIG. 3B shows the timings thereof. This circuit block is contained in a system control pulse generator, not shown. The clock KO135a dividing a source clock CLKO generated by a single reference oscillator is a clock for generating the reference signals SYNC2, SYNC3 which determine the occurrence timings of a sensor driving pulse ODRV and a sensor driving pulse EDRV. These reference signals SYNC2, SYNC3 have determined the output timings, depending on the setting values of presettable counters 64a, 65a which are set via a signal line 22 connected to a CPU bus. The reference signals SYNC2, SYNC3 initialize the frequency dividers 66a, 67a and the driving pulse generators 68a, 69a.

That is, since the reference signals SYNC2, SYNC3 are generated by the source clock CLKO all output from one oscillator source OSC558a, and a frequency dividing clock that is all generated synchronously, based on a horizontal synchronous signal HSYNC118 which is input into this block, the groups of pulses for ODRV118a and EDRV119a can be obtained as synchronous signals without jitters, thereby avoiding the fluctuation of signals due to the interference between sensors.

Figure 2B:
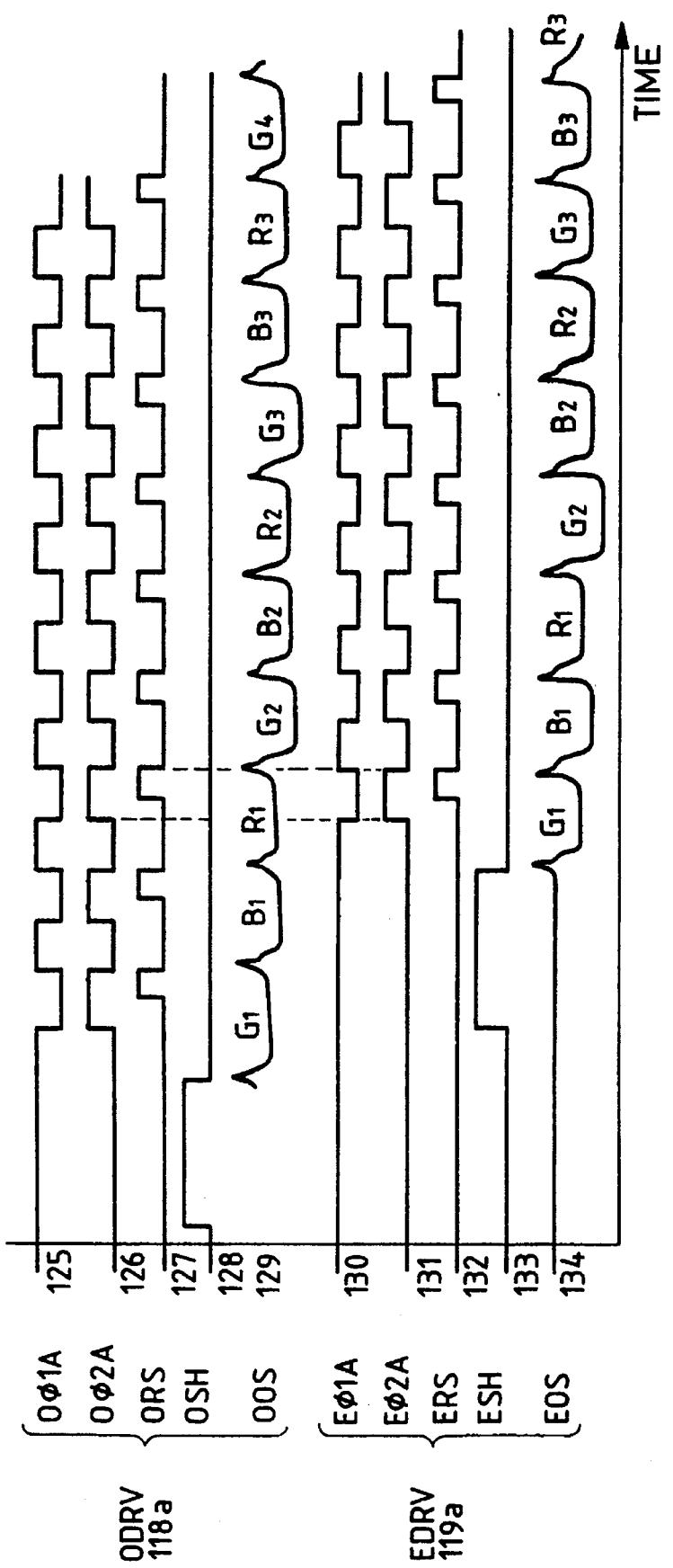

Here, sensor driving pulses ODRV118a obtained synchronously with each other are supplied to first, third and fifth sensors 58a, 60a and 62a, while EDRV119a are supplied to second and fourth sensors 59a, 61a, and in which video sigals V1–V5 are output independently from the sensors 58a, 59a, 60a, 61a, 62a, in synchronization with the driving pulses, respectively, and then amplified to predetermined voltages in the amplifier circuits 501-1 to 501-5 independent of each other as shown in FIG. 1, whereby V1, V3, V5 signals are sent out at the timing OOS129a as shown in FIG. 2B, while V2, V4 signals are sent out at the timing EOS134a, via a coaxial cable 101a, and they are input into a video image processing circuit.

Sample-and-hold circuit

A color image signal obtained by reading an input original image in five divisions into a video image processing circuit is separated into three color signals for G (green), B (blue) and R (red) in a sample-and-hold circuit S/H 104. Thereby, after the S/H process, they are subjected to the 3×5=15 signal processings.

A/D conversion circuit

The analog color image signals which are sampled and held for each color of R, G and B in the S/H circuit 104 are digitized for each channel 1–5 in an A/D conversion circuit 105 at the next stage, and are output to the next stage, independently for each channel 1–5 and in parallel.

Reading position difference correction circuit

In this example, as previously described, as the interval as much as four lines (63.5 μm×4=254 μm) is provided in the sub-scan direction, and an original is read with five stagger sensors disposed in five regions in the main scan direction, reading positions are different between preceding scanning channels 2, 4 and remaining channels 1, 3, 5. Thus, to interconnect them properly, the reading position difference correction is made by a reading position difference correction circuit 106 with a memory having a capacity as much as a multiplicity of lines.

Black correction/white correction circuit

Referring now to FIGS. 4A, 4B-1 and 4B-2 the black correction operation in a black correction/white correction circuit will be described.

Figures 1, 4B:
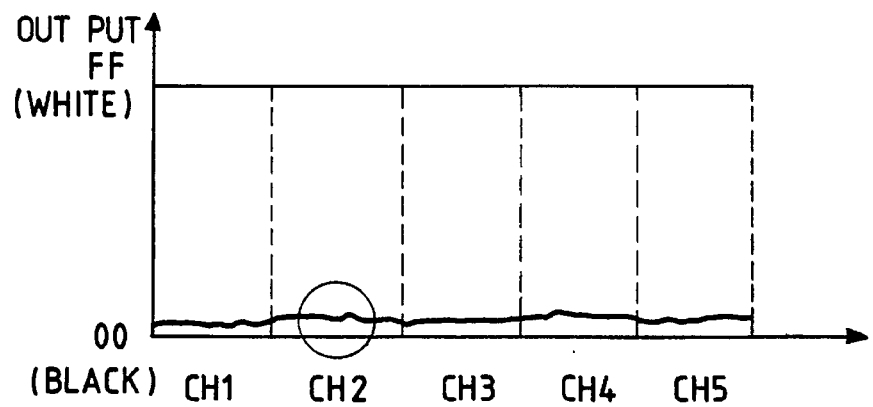
Figures 2, 4B:
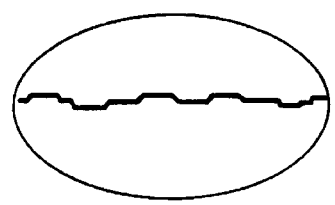

As shown in FIG. 4B-1, the black level outputs for channels 1-5 result in large dispersions between chips and between pixels, if the quantity of light entering each sensor is small. If an image is output without modification, stripes or irregularities will occur in image data portion.

Thus, there is a necessity of correcting the output dispersion of black portion, and the correction for dispersion is made in a black correction circuit as shown in FIG. 4A. Before the reading operation of an original, an original scanning unit is moved to a position of black board having a uniform density disposed on the non-image area at a leading portion of original plate, a (tungsten) halogen lamp is turned on, and a black level image signal is input into this circuit.

For a blue signal $B_{IN}$, a selector 82a selects A (ⓓ) and a gate 80a closes (ⓐ) and a gate 81a opens to store one line of image data into the black level RAM 78a. That is, a data line is connected from 151a to 153a via 152a, while ⓒ is output into a selector 83a so that the output 154a of an address counter 84a which is initialized by $\overline{HSYNC}$ and counts VCLK is input into an address input 155a of RAM 78a, whereby a black level signal amounting to one line of data is stored into RAM 78a (referred to as the black reference value fetch mode).

In reading an image, with RAM 78a being placed in the data reading mode, data is entered into the B input of subtracter 79a in the path from 153a to 157a for each line and each pixel. That is, the gate 81a closes (ⓑ), while the gate 80a opens (ⓐ). And a selector 86a becomes the A output. Accordingly, the black correction circuit output 156a is obtained as, for example, $B_{IN}(i)-DK(i)=B_{OUT}(i)$ for a black level data DK(i) in the blue signal (called as a black correction mode).

In the same way, green $G_{IN}$ and red $R_{IN}$ are controlled similarly with 77aG and 77aR. The control lines ⓐ, ⓑ, ⓒ, ⓓ, ⓔ for each selector gate for this control is controlled by the CPU through a latch 85a assigned as I/O for the CPU (not shown). Note that RAM 78a is accessible by the CPU if the B selections of selectors 82a, 83a, 86a are made.

Referring now to FIG. 5, the white level correction (shading correction) in the black correction/white correction circuit 107 will be described. The white level correction corrects for the dispersions of sensitivities in the illumination and optical systems or sensors, based on white data of image when illuminated by moving the original scanning unit to a position of a uniform white board. A fundamental circuit configuration is shown in FIG. 5A. The fundamental circuit configuration is the same as that in FIG. 4A, except that the correction is made by the subtracter 79 for the black correction, while it is made by the multiplier 79'a for the white correction, and therefore the explanation thereof is omitted.

Figure 5B:
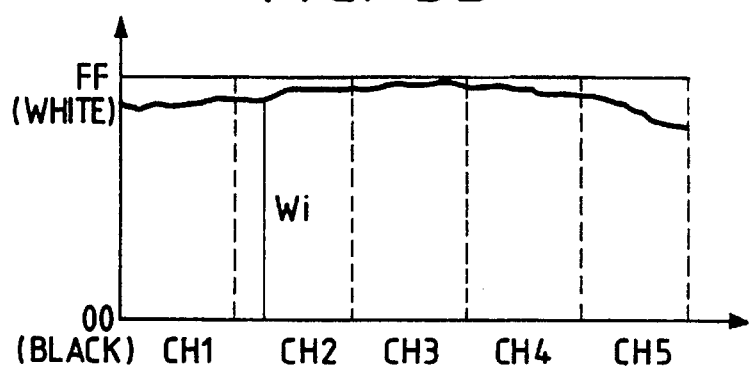
FIGS. 5A, 5B, 5C and 5D are a block diagram, a conceptual view, a format view and a flow chart for showing the detail of a white correction circuit, a concept of the white correction, data for the white board, and a procedure of the white correction, respectively.
Figure 5C:
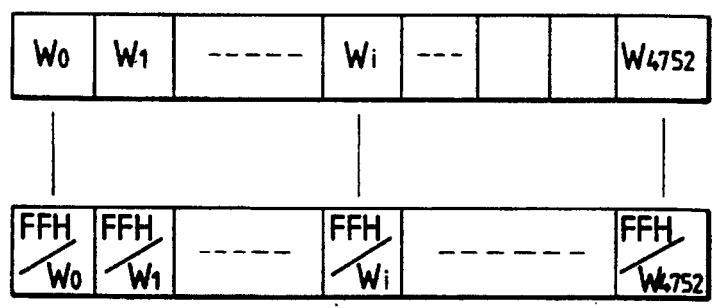
Figure 5A:
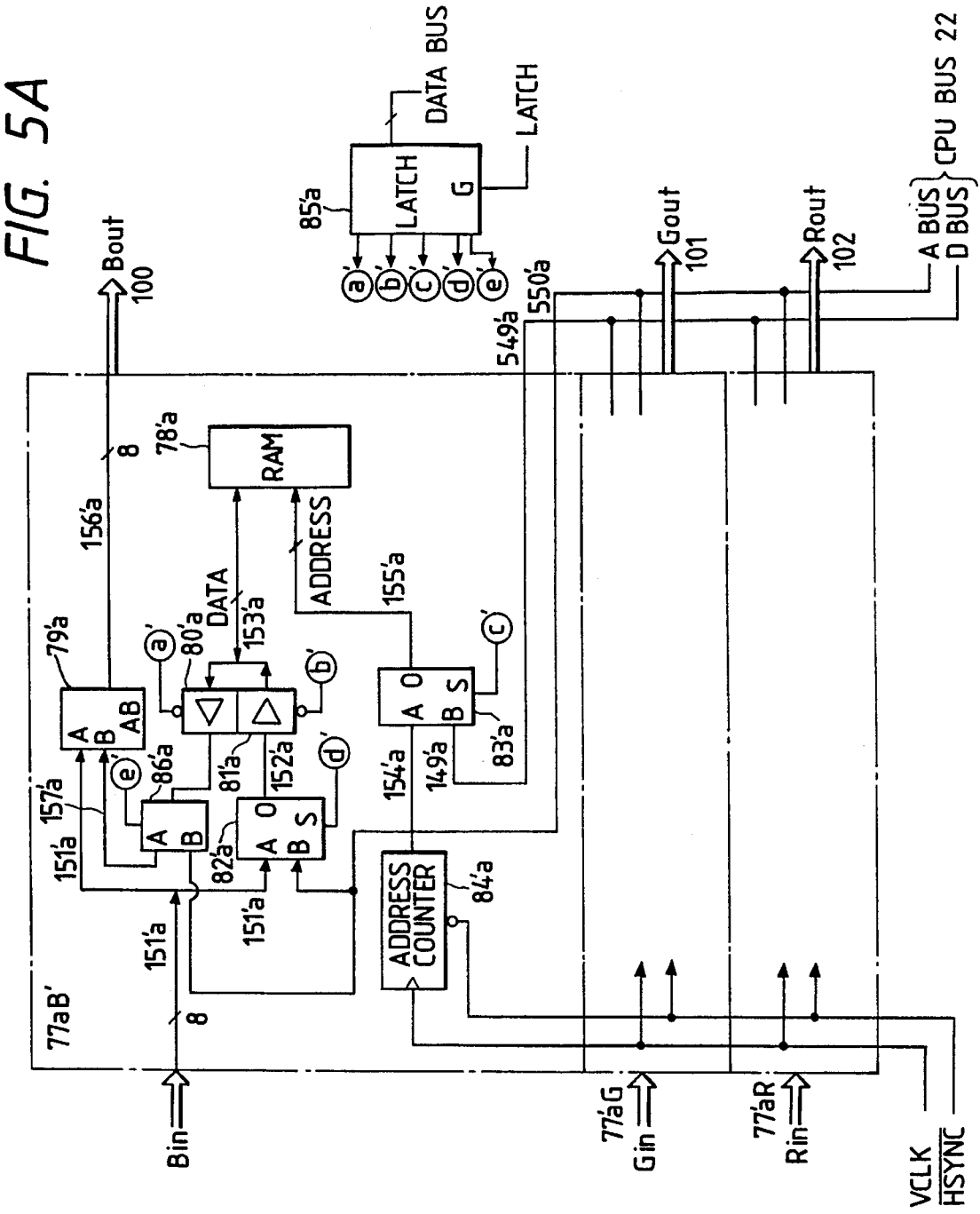

At the color correction, when CCD 101 for reading an original is located at a read position (home position) of the uniform white board, i.e., before the copying or reading operation, an exposure lamp, not shown, is turned on, and an image data at the uniform white level is stored in correction RAM 78'a for one line. For example, for a longitudinal length of A4 placed in the main scan direction, there are 16×297 mm=4752 pixels at 16 pel/mm, i.e., at least the capacity of RAM is 4752 bytes, and assuming a white board data Wi for the i-th pixel (i=1–4752), as shown in FIG. 5B, the white board data for each pixel is stored in RAM 78' as shown in FIG. 5C.

On the other hand, if Wi is given, data after correction should be $D_o=D_i \times FF_H/W_i$ for a read value Di for the i-th pixel of a normal image.

Thus, the CPU controls the latch 85'a to output ⓐ', ⓑ', ⓒ' and ⓓ' so that gates 80'a, 81'a opens and further controls so that B is selected at selector 82'a, 83'a, 86'a, whereby RAM 78'a is made accessible by the CPU.

Figure 5D:
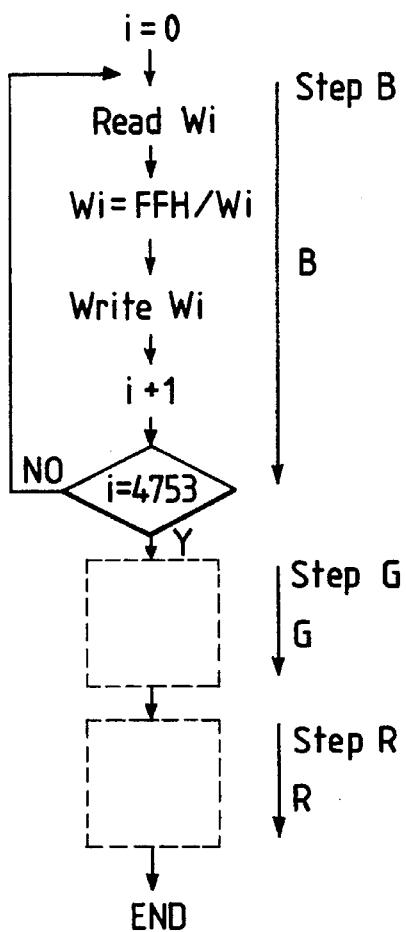

Next, in the procedure as shown in FIG. 5D, the CPU performs sequentially the operations of $FF_H/W_o$ for a leading pixel $W_o$, $FF/W_1$ for $W_1$, ..., and replaces data. If the procedure has been completed for the blue component of a color component image (step B in FIG. 5D), it is performed for the green component (step G) and the red component (step R) sequentially, and subsequently, gate 80'a opens (ⓐ') and gate 81'a closes (ⓑ') so that $D_o=D_i \times FF_H/W_i$ output for an input original image data Di, and selectors 83'a, 86'a select A, whereby a coefficient data $FF_H/W_i$ read out from RAM 78'a passes through a signal line from 153a to 157a, multiplied with the original image data 151a input from the other side and output.

As above described, the black level and white level corrections are made, based on the factors such as a black level sensitivity in the image input system, dark current fluctuation of CCD, a dispersion of sensitivity between sensors, a dispersion of quantity of light in the optical system, and a white level sensitivity, so that image data $B_{OUT}121$, $G_{OUT}122$, $R_{OUT}123$ evenly corrected for each color of black and white in the main scan direction can be obtained.

Brightness signal generator

Image data $R_{OUT}121$, $G_{OUT}122$, $B_{OUT}123$ subjected to the black correction and the white correction are input into a brightness signal generator 108 and a color discriminating circuit 109.

Figure 6:
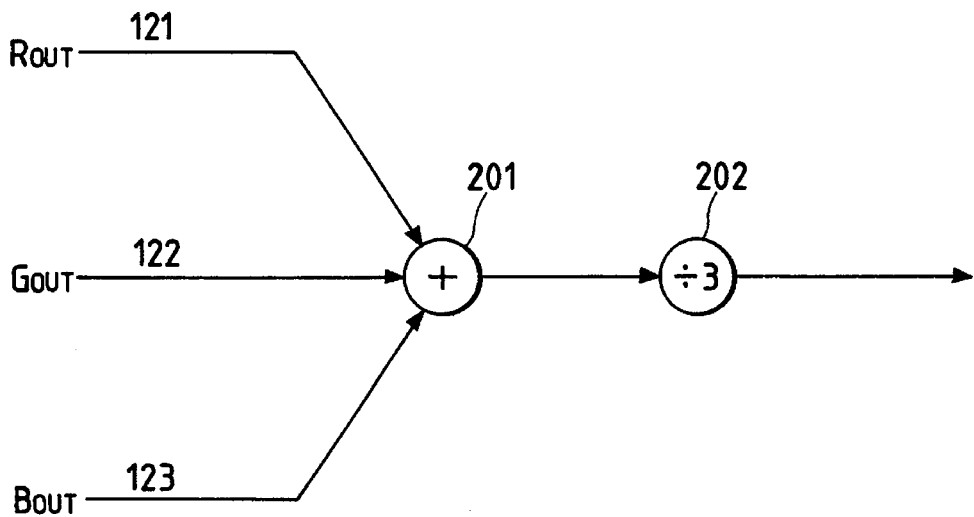
FIG. 6 is a conceptual view for showing the operation of a brightness signal generator as shown in FIG. 1.

The brightness signal generator 108 averages filler image read by a sensor 101, to make an ND image. FIG. 6 is a view for explaining the above operation, where input image data $R_{OUT}121$, $G_{OUR}122$, $B_{OUT}123$ are added in an adder 201. Thereafter, the sum is divided by three with a divider 202, and output.

Color discriminating circuit

Next, the color discriminating circuit 109 shown in FIG. 1 will be described. In this example, in discriminating the color, color-difference signals I, Q are used. These signals I, Q are generally given by the following expressions.

$$I=0.60R-0.28G-0.32B$$

$$Q=0.21R-0.52G+0.31B$$

Figure 7:
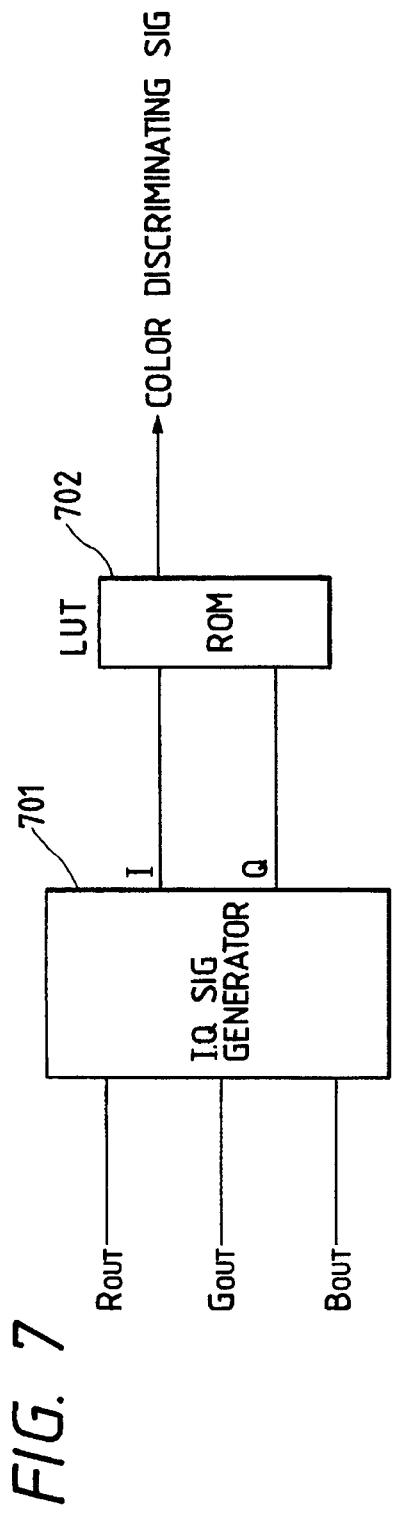
FIG. 7 is a block diagram for showing the circuit configuration of a color discriminating circuit as shown in FIG. 1.

The above operations are performed in an IQ generator 701 as shown in the circuit configuration of the color discriminating circuit 109 in FIG. 7. The I signal becomes red when increasing in the negative direction, is non-color near 0, and becomes blue-green when increasing in the positive direction, while the Q signal becomes yellow-green when increasing in the negative direction, is non-color near 0, and becomes violet when increasing in the positive direction.

Then, the IQ signals obtained in the IQ generator 701 are input into a look-up table (L.U.T) ROM 702 at the latter stage. LUT ROM 702 has stored data obtained by dividing the color plane represented by the IQ signals and encoding, and outputs a code signal corresponding to the input I, Q signals into a pattern generator circuit 110 as a color discriminating signal.

pattern generator circuit

Figure 8:
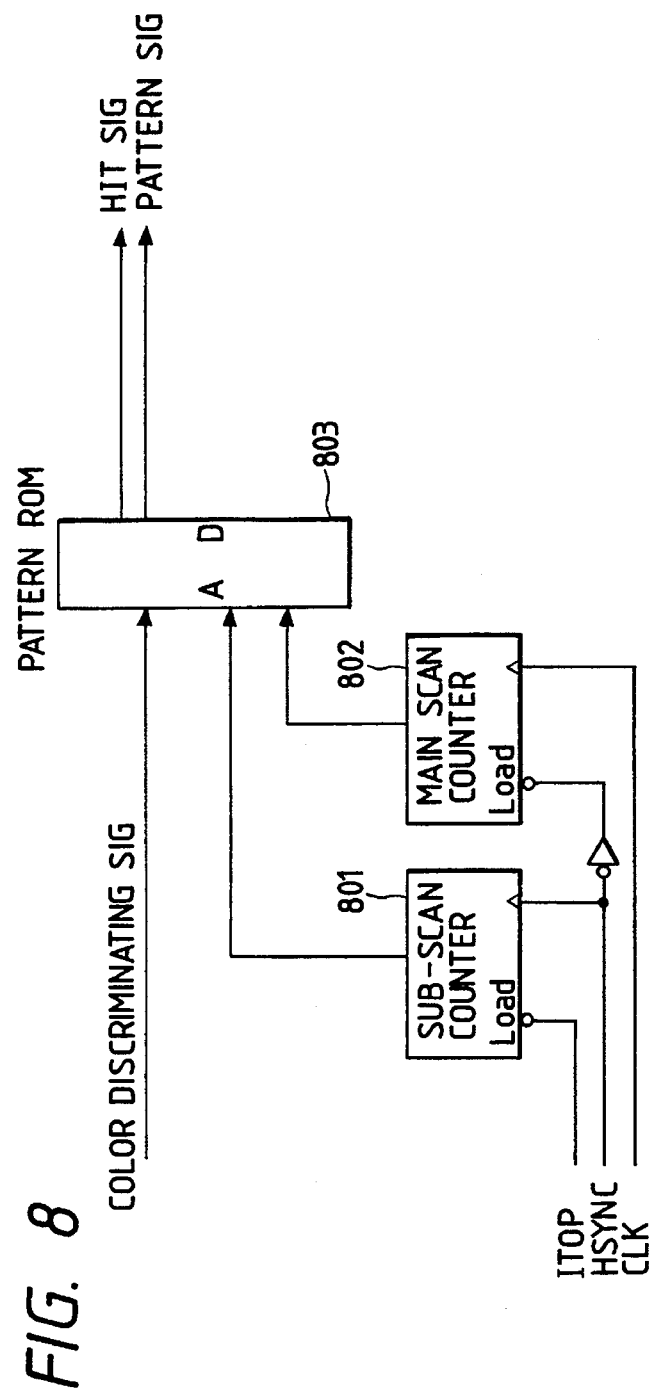
FIG. 8 is a block diagram for showing the circuit configuration of a pattern generator circuit as shown in FIG. 1.

The pattern generator circuit 110 will be described with reference to FIG. 8. ROM 803 for pattern has stored dot patterns corresponding to the colors as shown in FIG. 9. Each graphic pattern defines 16×16 dots as one pattern. ROM 803 for pattern performs the pattern generation so that the pattern is output repeatedly in the both the main scan and sub-scan directions, in accordance with the color discriminating signal. A main scan counter 802 operates by counting the video clock CLK in synchronization with the horizontal synchronizing signal HSYNC while a sub-scan counter 801 operates by counting the horizontal synchronizing signal HSYNC in synchronization with the ITOP signal.

The total 13 bits consisting of four bits each for the output of the above counters 801, 802, and five bits for the above color discriminating signal are input as an address of pattern ROM 803. That is, 32 types of patterns with 16 dots×16 dots for read colors (or color types) are generated.

The output from the pattern ROM 803 has a data length of 8 bits, in which MSB (most significant bit) is used for a control signal (HIT signal) within a pattern synthesizer 111 as will be described later, and the ROM 803 has written data so that MSB is normally 0 when no pattern is generated, that is, when an image area of color (such as black) is not to be converted into a pattern, is scanned, and 1 when pattern is generated.

Naturally, the above pattern ROM 803 may be implemented with RAM or the like. In such a case, the capacity and the bit assignments are the same as for ROM.

Pattern synthesizer

Figure 10:
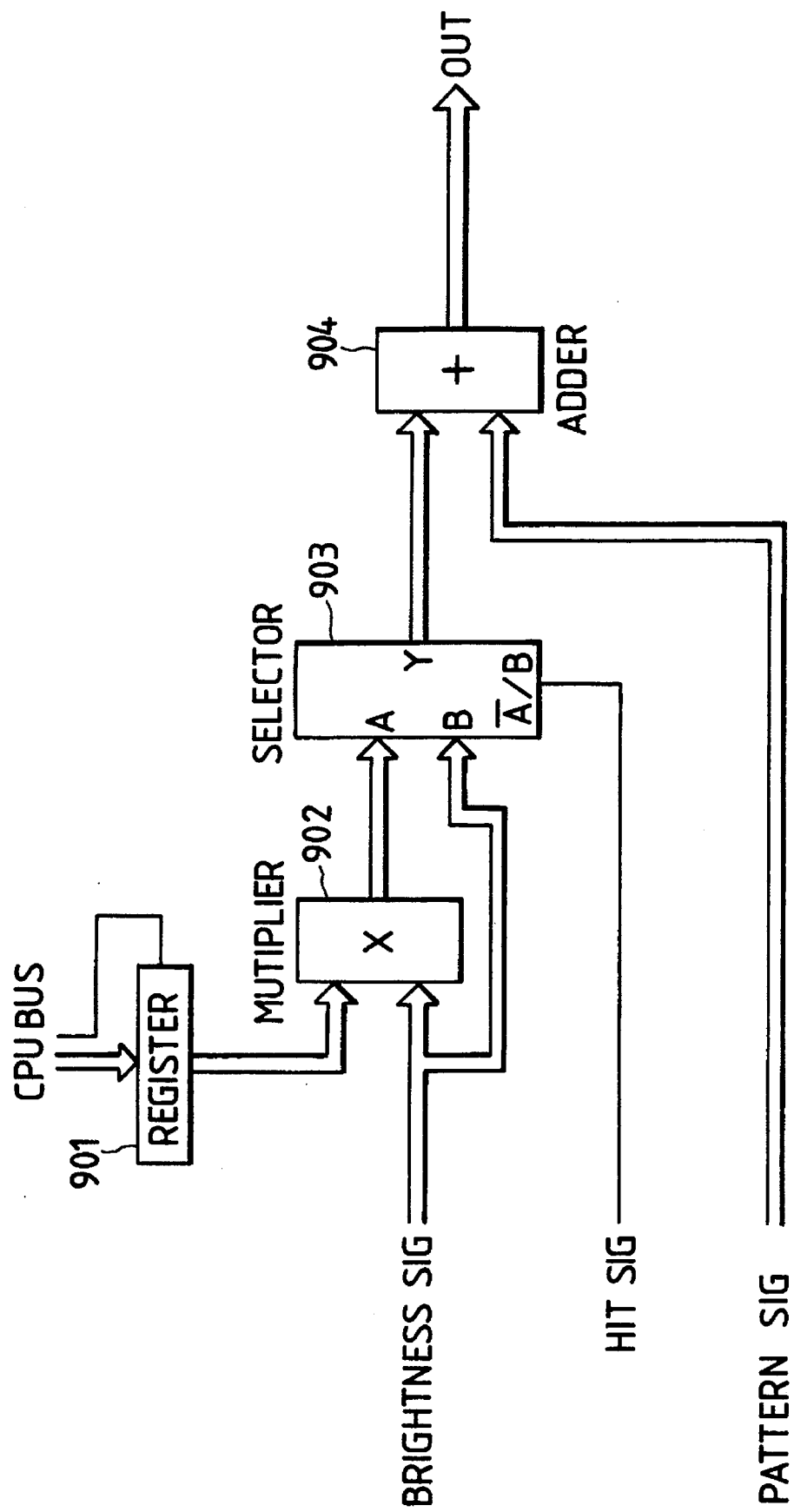
FIG. 10 is a block diagram for showing the circuit configuration of a pattern synthesis circuit as shown in FIG. 1.

Referring now to FIG. 10, the pattern synthesizer 111 will be described. A brightness signal input from the above-mentioned brightness 10 signal generator 108 is multiplied with a value that has been set in a register 901 by the CPU, in a multiplier 902. That is, the CPU can control the density so that the density of image data to which a pattern is to be added may be lighter than it actually is, as shown in FIG. 12. The register 901 is comprised of 8 bits. That is, the multiplier 902 performs the multiplication processing with the coefficients from 0/128 to 255/128 for an input brightness signal.

The brightness signal obtained by multiplying a through brightness signal with the above-mentioned coefficient is input into the selector 903 which is switched with a HIT, that is, 1, signal, and output. That is, if the HIT, that is, 0, signal is HIT, an output from the multiplier 902 which is entered into A of the selector 903 is selected, while if it is not HIT, a through brightness signal which is entered into B of the selector 903 is selected.

The signal selected by the selector 903 is subjected to the additive processing in adder 904 to add a pattern signal from the pattern generator circuit 110. Note that the level of the brightness signal may be changed after synthesis with the pattern signal.

Log converter

An image data subjected to the additive processing is converted to a density signal in a Log converter 112, as shown in FIG. 1, for the conversion of brightness to density. The Log converter 112 relies on a look-up table using a ROM. A signal converted into the density signal in the Log converter 112 is output to a monochromatic printer (for example, a laser beam printer) to form an image.

Figures 2, 11:
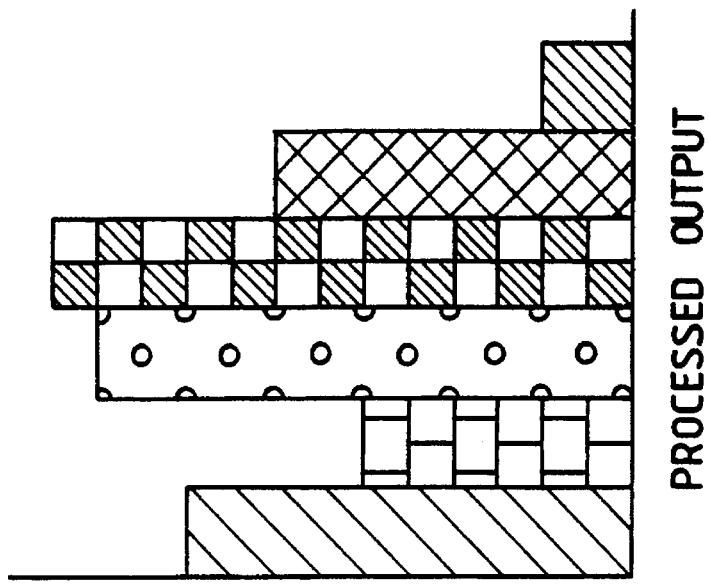
Figures 1, 11:
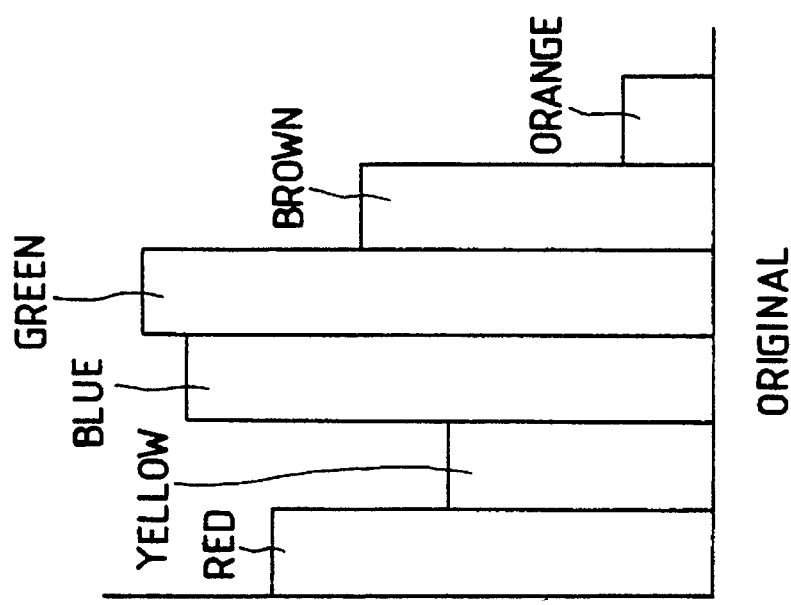

FIG. 11-1 shows an example of an original subject which is read by the color reading sensor 101 in the above-mentioned example of the present invention, and FIG. 11-2 shows an example of the result that the above-mentioned original subject is read, subjected to the above-mentioned image processing and output to the printer. Note that the relation between color and pattern is based on the example as shown in FIG. 9.

FIG. 12 shows the operation of the above-mentioned example more clearly. That is, with a monochromatic printer, or a copying machine using a normal white/black printer, an original subject of red is printed only in gray uniformly (normal process), while in the operation according to the example of the present invention, it is output in the state where light gray and patterned red are synthesized, so that even in the white/black print, the color of the original can be recognized from the graphic pat tern recorded.

As above described, the present example, with the above-described constitution, can provide an image processing apparatus with which an inexpensive copying machine can be implemented without the necessity of polychromatic recording means and spoiling the quantity of information concerning the colors of an input image.

Another example of the present invention will be described in detail.

Figure 13A:
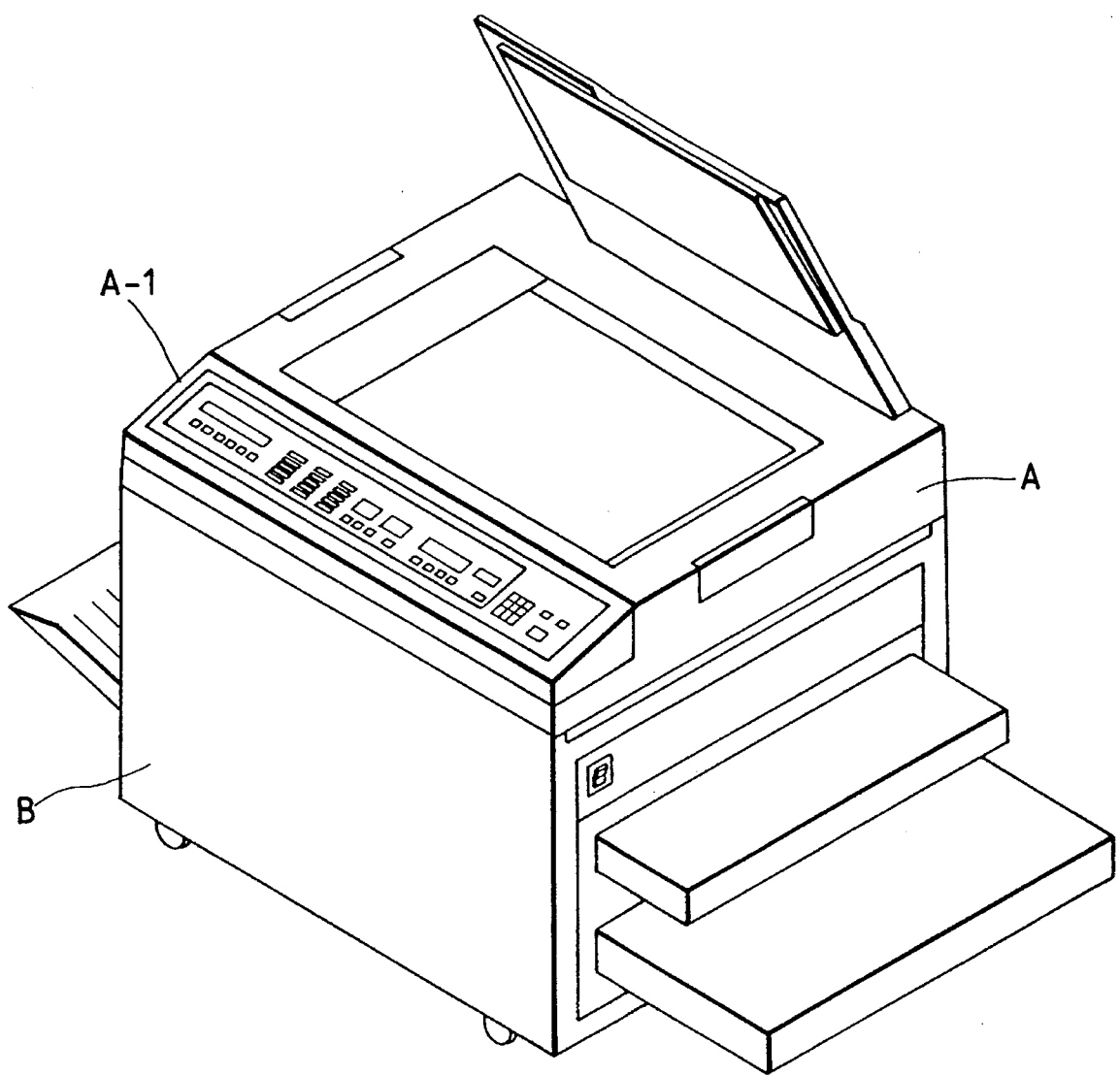
FIG. 13A is an external perspective view of an image copying machine according to a second example of the present invention.

FIG. 13A is a view showing a copying machine to which the present example and the previous example are both applicable, and this copying machine is comprised of two units, a reader A for reading an original image and a printer B for reproducing the image onto a recording medium. And FIG. 13B is a structural cross-sectional view of the reader A and the printer B. As shown in the figure, the original is laid with an upper surface down on an original glass (plate) 3, pressed down on the glass 3 by an original cover 4. And the original is illuminated by a fluorescent lamp 2, and the reflected light is converged via mirrors 5, 7 and a lens 6 onto the surface of CCD 1.

The mirror 7 and the mirror 5 moves at a relative speed of 2 to 1. These optical systems are reciprocated at constant speeds under PLL by a DC servo motor (not shown). At the equal magnification, an outgoing path (from left to right) is 180 mm/sec, while a return path (from right to left) is 800mm/sec irrespective of the magnification. And the maximum size of original to be processed is A3, with the resolution being 400 dot/inch, and the required number of bits for a CCD1 is 4678 (=297/25.4×400) bits.

Accordingly, the reader A uses a 5000-bit CCD. The period of a main scan is 352.7 µ sec (=10/180×25.4/400)

Figure 13C:
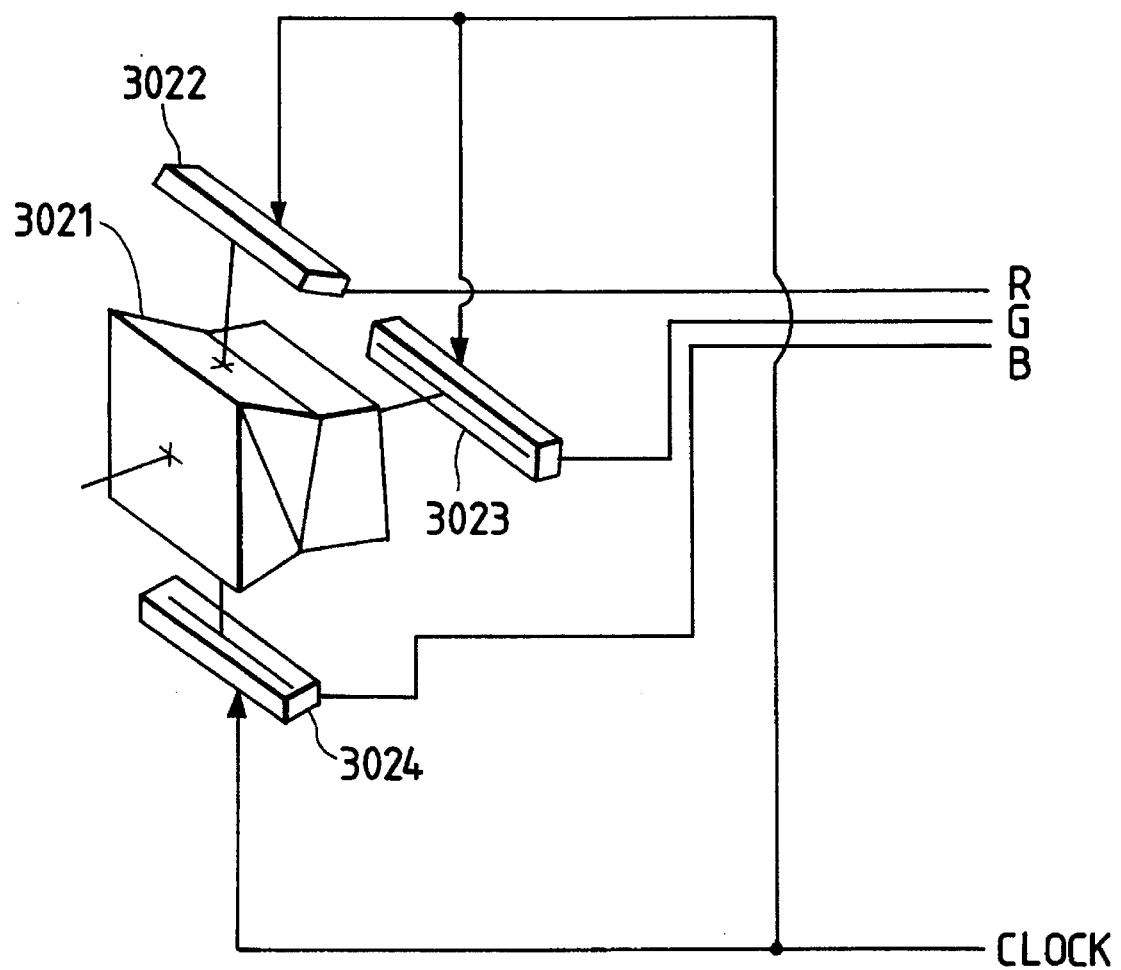
FIG. 13C is a view for explaining the construction of a CCD as shown in FIG. 13B.

An image signal indicating the density of image is obtained by line-scanning the original image with the CCD 1. The CCD 1 is constructed of a color separation prism 3021 for separating the color into three colors R, G and B, and CCD sensors 3022, 3023 and 3024 for reading the respective lights of R, G and B, as shown in FIG. 13C, and outputs the reflected light by separating it into three colors R, G and B. Here, the reflected light subjected to the color separation is processed into bit serial data by each image processor of the reader A as will be described later, and input into a laser scan optical system unit 25 of the printer B. And the unit 25 consists of a semiconductor laser collimator lens, a rotational polygon mirror, a Fθ lens, and an inclination correction optical system.

An image signal from the reader A is applied to a semiconductor laser, and converted from an electrical signal to an optical signal, directed through the collimator to the polygon mirror rotating at high speed, and the reflected light is entered into a photosensitive member 8 and scanned. Process components which allow the formation of image onto the photosensitive member include a charge remover 9, a charge remover lamp 10, a primary charger 11, a secondary charger 12, a front exposure lamp 13, a developing device 14, a paper feed cassette 15, a paper feed roller 16, a paper feed guide 17, a registration roller 18, a transfer charger 19, a separation roller 20, a conveying guide 21, an fixing member 22, and a tray 23. The speeds of photosensitive member 8 and conveying system are 180 mm/sec, and the printer B is so-called a laser printer.

A copying machine in this example is provided with an intelligent such as an image edit, with its function including a variable magnification with 1% steps in the range from 0.35 to 4.0, the trimming for extracting image only 10 in a specified region, the move function for moving a trimmed image to an arbitrary position on a paper, and the coordinate detection function for the position of an original laid on the original board 3.

Figure 14:
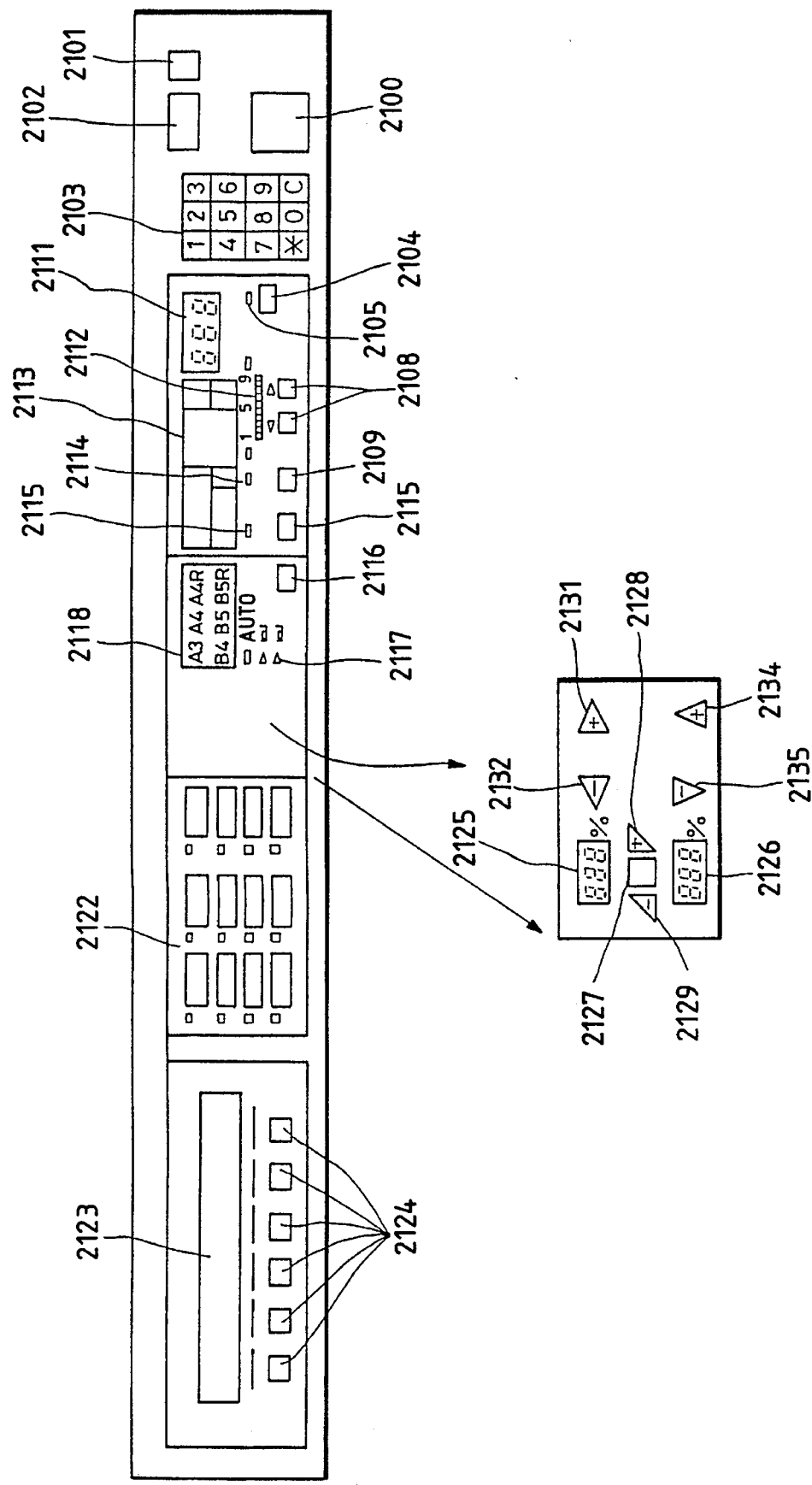
FIG. 14 is a view showing the detail of a console unit in an image copying apparatus according to an example.

Next, the detail of a console unit A-1 as shown in FIG. 13A will be detailed with reference to FIG. 14.

2100 is a copy start key, 2101 is a key for returning the copy mode to the normal state, 2102 is a copy stop key, and 2103 is a group of ten keys for 0–9, a C key for clearing the number of sheets, and a * key for use in inputting a numerical data. 2104 is a key for turning on or off the original position coordinate detection function, and 2105 is a display part for displaying the state of ON/OFF. 2108 is key for raising or lowering the density, and 2112 is a display part for displaying the density. 2109 is a key for turning on or off the automatic density control function, and 2114 is a display part for displaying the state.

2110 is key for turning on or off the dither processing function for original, and 2115 is a display part for displaying the state of ON/OFF. 2111 is a display part for the number of copies, and 2113 is a display part for displaying various errors. 2116 is a key for selecting the paper feed stage and automatic paper selection functions, and 2117 and 2118 are display parts for displaying the paper feed stage and the size of paper, respectively. 2122 is a console display section, or a preset key display section for presetting and invoking the copy mode. 2123 is a liquid crystal display section comprised of 32 digits in 5×7 dot matrix. 2124 is a group of keys, or soft keys for selecting a desired copy mode among the copy modes displayed on the display section 2123.

2125 is a display part for displaying the magnification MY (%) in the sub-scan direction, and 2126 is a display part for displaying the magnification MX (%) in the main scan direction. 2127 is a key for switching the magnification MX in the main scan direction and the magnification MY in the sub-scan direction between two modes of the equal magnification 100% and the automatic variable magnification (MX=MY). 2128 and 2129 are keys for incrementing or decrementing MX and MY each by 1% simultaneously. 2131 and 2132 are keys for incrementing or decrementing only MX each by 1%, while 2134 and 2135 are keys for incrementing or decrementing only MY each by 1%.

Figure 15:
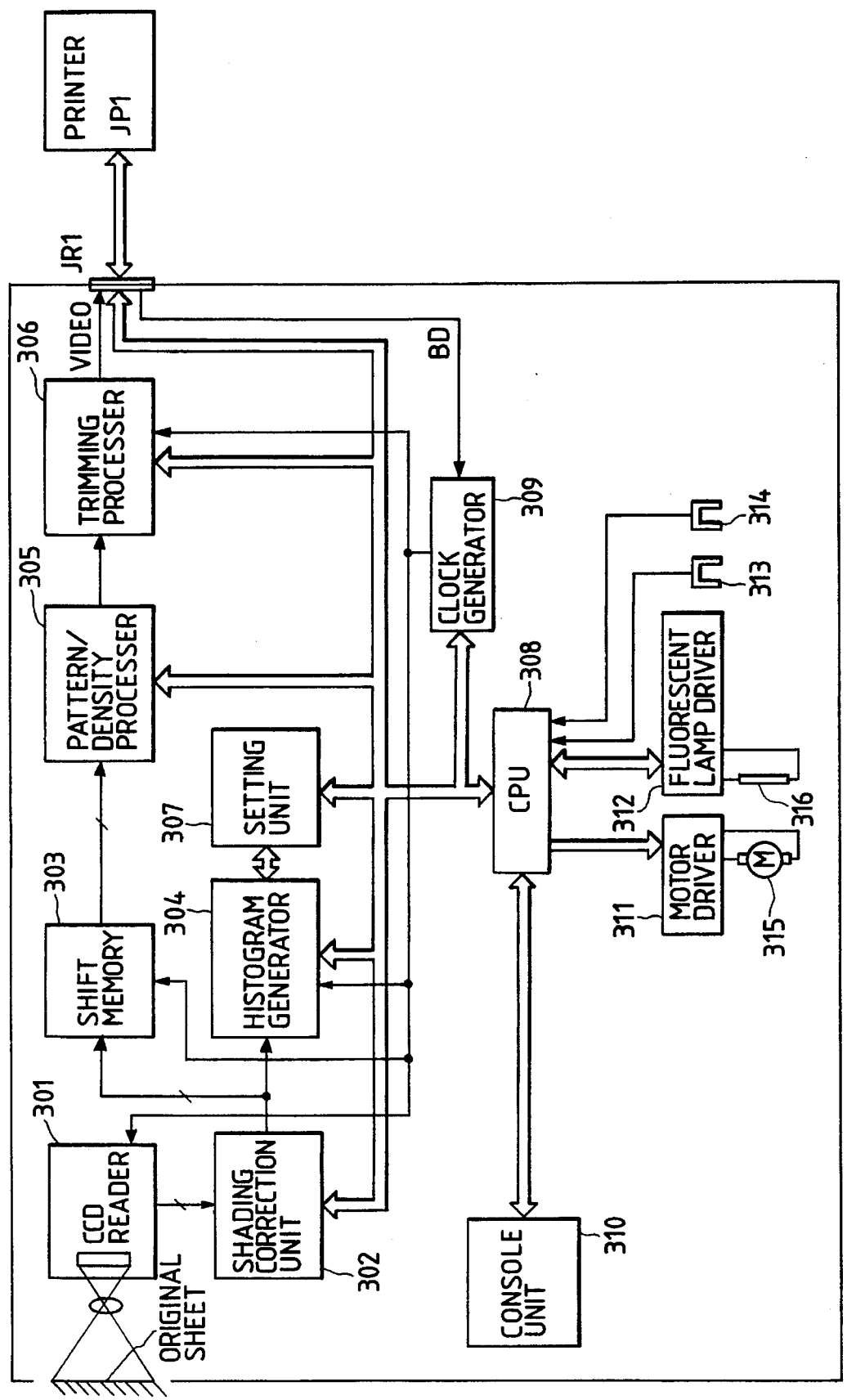
FIG. 15 is a schematic block diagram showing the configuration of a reader unit in an image copying machine according to the second example of the present invention.

Next, the reader A will be described with reference to a schematic block diagram as shown in FIG. 15.

A CCD reader 301 contains a CCD, a clock driver for the CCD, an amplifier of signal from the CCD, and an A/D converter for converting from analog signal to digital signal.

From the CCD reader 301, image data of R, G and B converted into 8-bit digital signals (256 gradients) are output, and input into a shading correction unit 302. This shading correction unit 302 stores image signals in a shift memory 303 temporarily, after the shading quantity due to a light source or lens is detected and corrected. The shift memory 303 is provided with 2 lines of shift memory for each R, G and B, in which when N-th line image data are written into the first memory, N-1-th line image data are read out from the second memory. The shift memory 303 also comprises a write address counter for writing image data into shift memories, a read address counter for reading image data, and an address selector circuit for switching the address signal from those two counters.

Image signals to which the shading correction was applied are input into a histogram generator 304, where a histogram of image signals as will be described later is created. Then, a setting unit 307 selects the colors the number of which is less than a predetermined number among histogram data obtained with a predetermined selection method, as will be described later, and selects predetermined patterns and densities corresponding to the selected colors, respectively.

On the other hand, image signals output from the shift memory 303 are input into the next pattern density processor 305, where image signals are subjected to the conversion processing to patterns and densities set in the above-mentioned setting unit 307, and output to a trimming processor 306. The trimming processor 306 processes an arbitrary interval of image data in the main scan line forcedly into "0" or "1", determines whether or not image data should be transferred to the printer B, thereby enabling the editing of image.

The CPU 308 is a microcomputer, comprising CPU, ROM, RAM, timer circuit, and I/O interface. The CPU 308 controls the console unit 310, for controlling the reader A in accordance with the settings by an operator, and controlling the printer B through the serial communication. Further, it controls a DC servo motor 315 by presetting a speed data corresponding to the magnification into a DC servo motor driver 311. And it controls the ON/OFF of a fluorescent lamp 316 and the light quantity at the lighting by controlling a fluorescent driver 312. And 313 and 314 are positional sensors with which the CPU 308 can detect the position of the optical system.

The reader A is connected to the printer B, via a connector JR1 and a connector JP1 of the printer B, and the control signals necessary for the image data communication and the serial communication are transmitted and received between the reader A and the printer B. The horizontal synchronizing signal BD is received via the connector JR1 from the printer B, and input into a clock generator 309. The clock generator 309 generates the transmission clock for the CCD signal in synchronization with the horizontal synchronizing signal BD, and the read/write clock for the shift memory 303. And from the printer B, a size signal indicating the paper size usable on the printer B is input via the connectors JP1, JR1 into the reader A.

Next, the operations of the histogram generator 304, the setting unit 307 and the pattern density processor 305 will be described with reference to FIG. 16.

Figure 16:
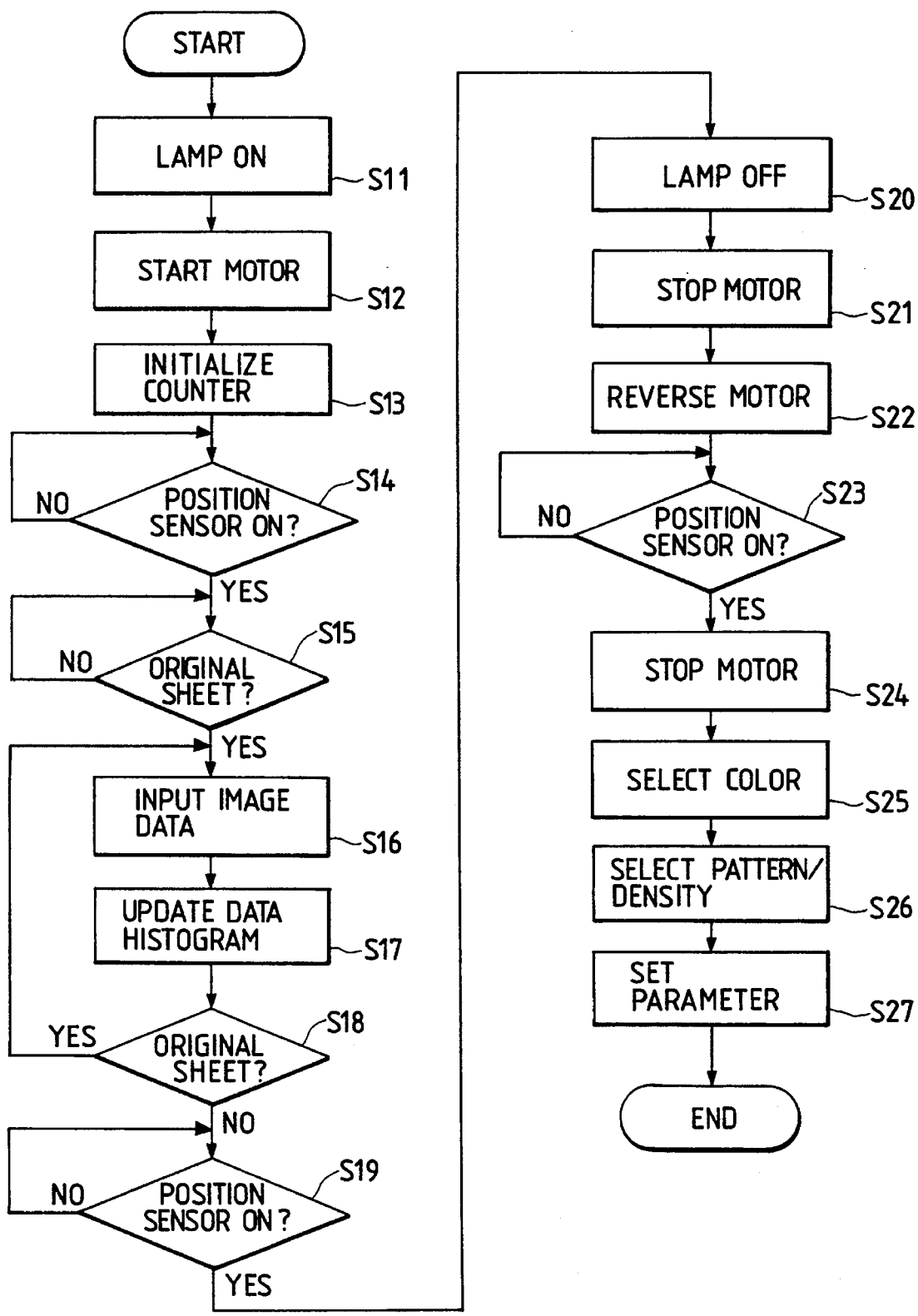
FIG. 16 is a flow chart for showing the operation procedure according to the second example of the present invention.

FIG. 16 is a flow chart for showing the operations of the histogram generator 304, the setting unit 307 and the pattern density processor 305.

First, at step S11, the CPU 308 outputs a control signal indicating that the fluorescent lamp is turned on, to the fluorescent lamp driver 312, and at next step S12, outputs a control signal for controlling the motor 315 to scan the sensors, to the DC motor driver 311. And at step S13, the frequency counter for use in generating the histogram is initialized.

Next, at step S14, whether the position sensor 313 at the edge portion of original plate is ON or OFF is judged, and if the position sensor 313 is ON, the processing proceeds to step S15, where whether or not original sheet exists is judged. This judgement process is sufficient with a general method for detecting original sheet, and if original sheet is detected, the processing proceeds to step S16, where image data is input.

At step S17, the histogram data generated by the histogram generator 304 based on input data is updated. Next, at step S18, whether or not original sheet exists is judged. Here, the above processing steps S16 to S17 are repeated by scanning the sensors until there is no more original to read.

However, if original to be read is exhausted, the processing proceeds to step S19, where whether the position sensor 314 at the other edge portion of original plate is ON is checked. As the result, if the sensor is ON, the processing proceeds to step S20, in which the CPU 308 outputs a control signal indicating that the fluorescent lamp is turned off, to the fluorescent lamp driver 312. And at next step S21, it outputs a control signal indicating that the motor is stopped, to the DC motor driver 311.

Then, if the motor is stopped, at step S22, the CPU 308 outputs a control signal indicating that the motor is reversed to return to a home position, also to the DC motor driver 311. At step S23, whether or not the position sensor 313 is on is judged. If the position sensor 313 is on, the processing proceeds to step S24, in which the CPU 308 outputs a control signal indicating that the motor is stopped, to the motor driver 311.

After execution of steps S11 to S24, a histogram as described below is generated. Note that the histogram is to simply count R, G and B data. This is, the result of histogram as shown in FIG. 17 is obtained.

Next, at step S25, for example, when a predetermined number of colors is three, respective minimum values in the obtained histogram R, G, B are obtained as shown in FIG. 17, and from those minimum values, respective regions $R_0$, $R_1$, $R_2$, $G_0$, $G_1$, $G_2$, $B_0$, $B_1$, $B_2$ and the boundaries to be divided $r_{01}$, $r_{12}$, $g_{01}$, $g_{12}$, $b_{01}$, $b12$ are determined for R, G and B, respectively. And the processing proceeds to step S26, where predetermined patterns and densities are selected for the number of selected colors R, G and B.

Figure 17A:
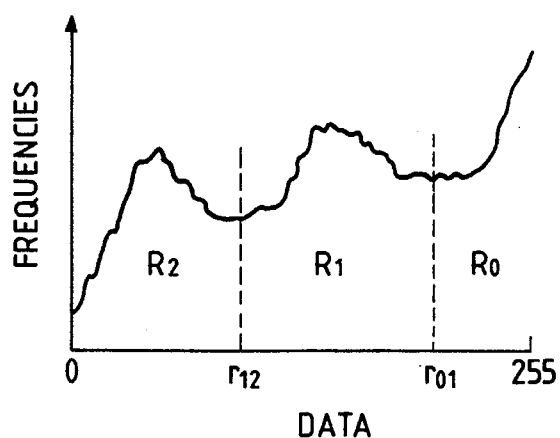
FIGS. 17A–17C are views showing the histogram for each data of R, G and B.
Figure 18A:
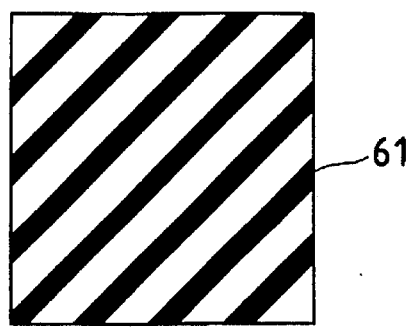
FIGS. 18A–18C are views showing the patterns for R, G and B, respectively, according to an example.
Figure 18B:
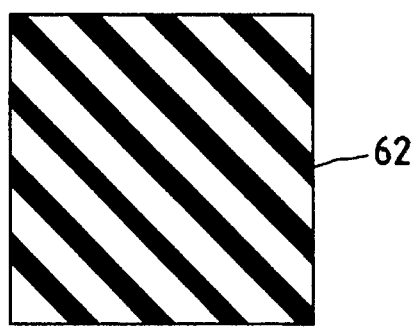
Figure 18C:
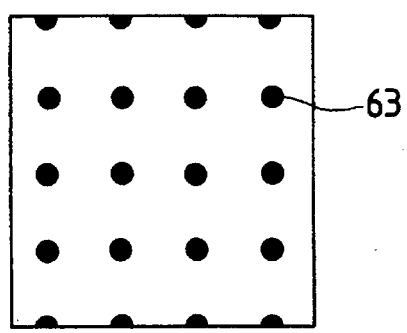

Here, predetermined patterns and densities can be determined as follows. As shown in FIGS. 18A to 18C, the patterns as shown in FIG. 18A, FIG. 18B and FIG. 18C are preassigned to R, G and B, respectively. Then, for regions $R_0$, $R_1$ and $R_2$ as shown in FIG. 17A, data as indicated by 61 is assigned with the settings of $R_0=255$, $R_1=170$ and $R_2=85$, so that $R_0>R_1>R_2$ holds in the pattern as shown in FIG. 18A.

Figure 17B:
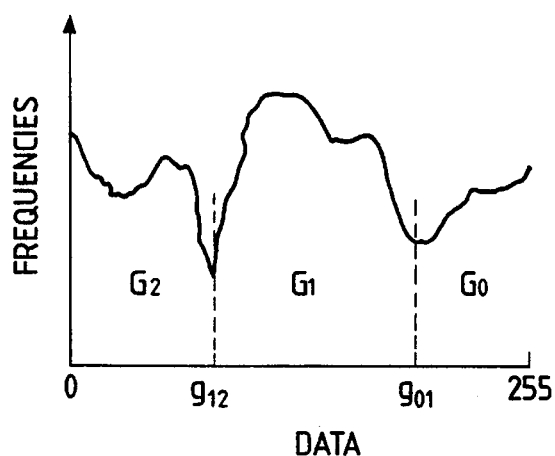
Figure 17C:
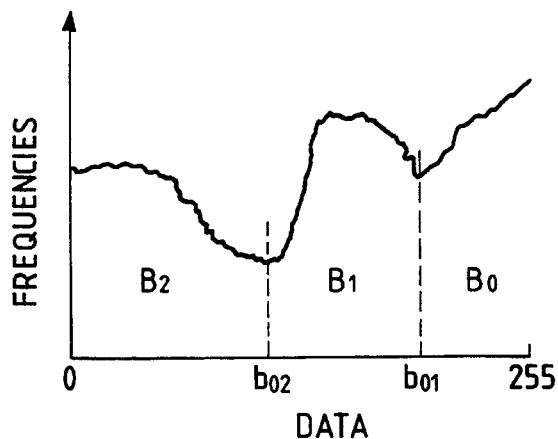

Similarly, also for regions $G_0$, $G_1$ and $G_2$ as shown in FIG. 17B, data as indicated by 62 is assigned with the settings of $G_0=255$, $G_1=170$ and $G_2=85$, so that $G_0>G_1>G_2$ holds in the pattern as shown in FIG. 18B. Similarly, also for regions $B_0$, $B_1$ and $B_2$ as shown in FIG. 17C, data as indicated by 63 is assigned with the settings of $B_0=255$, $B_1=170$ and $B_2=85$, so that $B_0>B_1>B_2$ holds in the pattern as shown in FIG. 18C.

Next, at step S27, the pattern density processor 305 sets the parameter and density value of pattern so that pattern and density data corresponding to a desired input value of R, G and B are selected, and output to the next trimming processor 306.

In the neutral gray region, e.g., black letters, the output of image is not patterned data but original image data, without change.

Next, the constitution of pattern density processor 305 in the example will be described with reference to FIG. 19.

As shown, the image read signals R, G, B are input into a pattern density conversion circuit 400, 401, 402, respectively. Here, data values of R, G, B are converted into patterns and pattern densities as shown in FIGS. 18A, 18B and 18C, respectively, and output.

On the other hand, data values of R, G, B are input into a non-color discrimination circuit 404, and whether non-color or not is judged from data values of R, G and B for read pixels. The following expression is used for this judgement, and if true, the non-color discrimination is made, and a discrimination signal "1" is output. And if not true, the color discrimination is made, and a discrimination signal "0" is output. This result is input into selector 406, where it is used for selection of input signals as will be described later.

$$G/(R+G+B)=K_0$$

$$G/(R+G+B)<\alpha K_0$$

$$B/(R+G+B)<\beta K_0$$

Where $\alpha$, $\beta$ are constant values.

Data values of R, G and B are input into a non-color conversion circuit 403, and output as a non-color conversion signal Y with the conversion expression, for example, $$Y=0.3R+0.6G+0.1B$$

and then input into one terminal of the selector 406.

Respective outputs from the pattern density conversion circuit 400, 401, 402 as above mentioned are superimposed using an OR circuit 405, and input into the other terminal of the selector 406. The selector 406 selects the outputs the input data, based on the discrimination signal from the non-color discrimination circuit 404, and the density conversion circuit 407 performs the density conversion optimal for the characteristic of the printer.

In other words, the selector outputs the signal from the non-color conversion circuit 403 without change if non-color discrimination is made, and if not, outputs the signal from the OR circuit 405 without change.

Figure 20A:
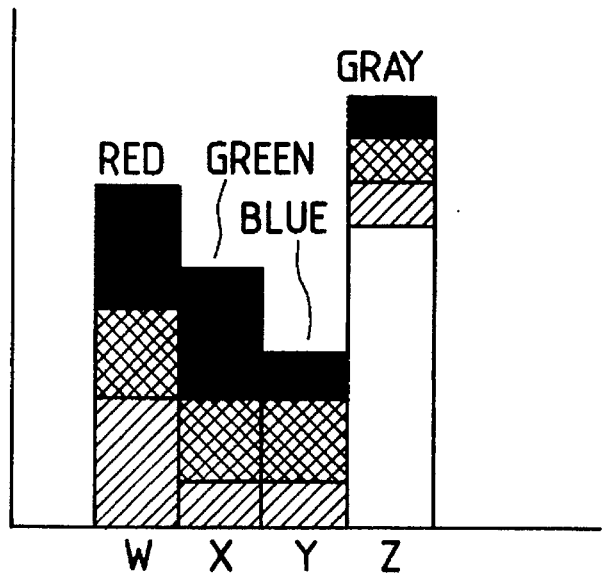
FIG. 20A is a view showing an original subject in an example.
Figure 20B:
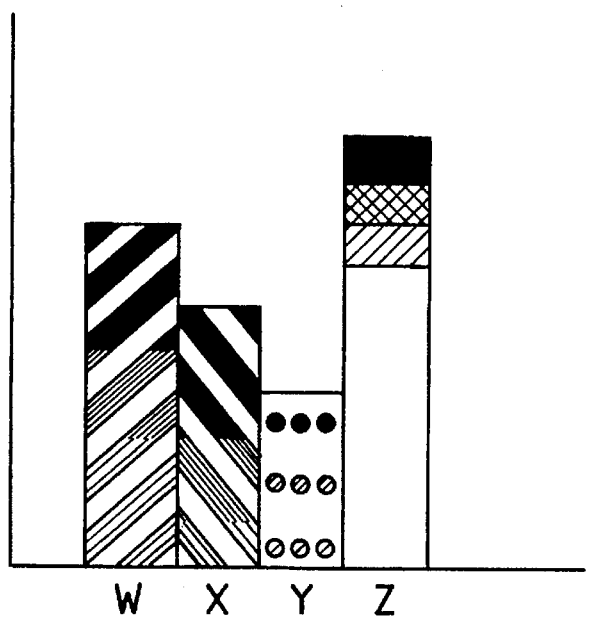
FIG. 20B is a view showing the result of the pattern density processing according to an example.

With the above processings, for example, an original graph as shown in FIG. 20A is processed and printed as shown in FIG. 20B.

If as shown in FIG. 20A, W part is red, X part is green, Y part is blue, Z part is gray, and their lower portions become gradually lighter than their upper portions, and lines are represented with black, as shown in FIG. 20B, W part is a pattern as indicated in FIG. 18A, X part is a pattern as indicated in FIG. 20B, Y part is a pattern as indicated in FIG. 20C, and the lower portions are represented lighter because respective patterns include three stages of densities. Z part and lines are represented as they are in the original.

Another modified example of the present invention will be described with reference to the drawings.

It should be noted that unlike the previous examples, this example restricts the type of patterns to prevent the overlap of patterns with each other.

With reference to FIG. 21, the details different from those of the previous examples will be described, and the explanation of portions having the same functions are omitted.

Figure 19:
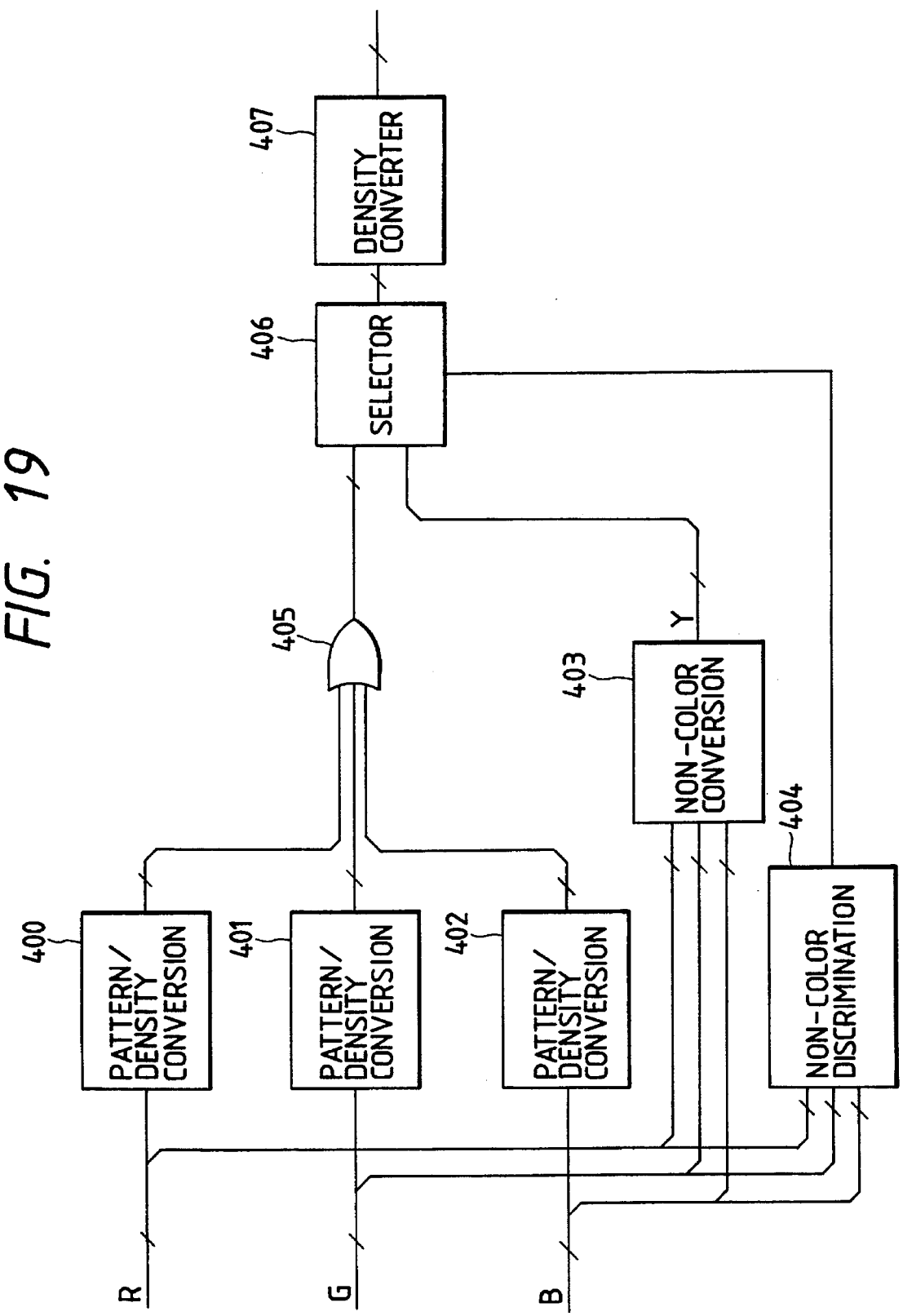
FIG. 19 is a block diagram showing the constitution of a pattern density processor according to the second example of the present invention.
Figure 22A:
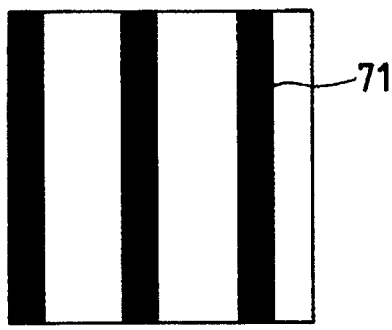
FIGS. 22A–22C are views showing the patterns for R, G and B, respectively, according to another example.
Figure 22B:
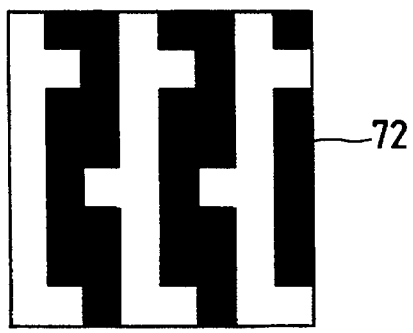
Figure 22C:
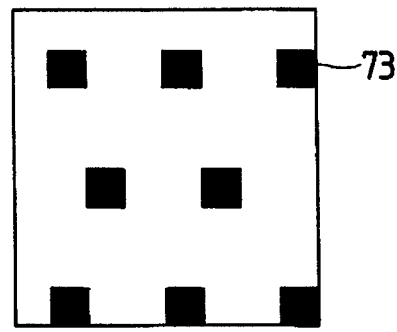

First, in FIG. 21, the point different from that of FIG. 19 is that the non-color discrimination circuit 404, the non-color conversion circuit 403 and the selector 406, as shown in FIG. 19, do not exist. FIGS. 22A, 22B and 22C are views showing the patterns of R, G and B, respectively, when the number of predetermined patterns is three.

Density values for portions 71, 72, 73 painted by black, in this example, unlike the previous examples, are processed in such a manner that the densities are not restricted to three stages, and the read data values becomes respective density values 71–73 without change. That is, with 8-bit data, pattern is only selected and each density 71–73 is made proportional to the 8-bit data. And the density conversion circuit 407 performs the density conversion optimal for the characteristic of printer.

Outputs of the pattern density conversion circuits 400, 401 and 402 are input into the OR circuit 405 and superimposed.

Figure 23A:
FIG. 23A is a view showing a non-color pattern.
Figure 23B:
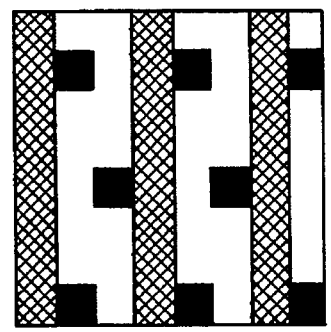
FIG. 23B is a view showing a color pattern.

However, since the patterns as shown in FIG. 22 do not have overlapping portions, if data is non-color, i.e., there is no R, G, B data, the patterns become as shown in FIG. 11A, so that the non-color is not patterned with any density. On the other hand, if R, G, B data are different, i.e., data are color, density values of 71–73 as shown in FIG. 22 are different, resulting in a pattern as shown in FIG. 23B.

In this way, the non-color data is not patterned, while the color data is patterned, with various patterns being provided for R, G and B data.

As detailed above by way of examples, a problem of causing pseudo contours can be eliminated because patterns are superimposed even in the area where the hue gradually changes, so that the information of "gradually" changing can be realized without being lost.

Further, the non-color data is not patterned, and letters can be represented as clearly as conventionally.

Note that the printer is not limited to a laser beam printer, but may be an ink jet printer, a thermal printer, etc. And the generator of a color image signal is not limited to a color reader, but is also applicable to a video camera, a computer, a color facsimile, etc.

As described above, according to the present invention, a plurality of images with different colors contained in an original subject can be reproduced to be recognizable.

The present invention is not limited to the above described examples, but various modifications and variations are possible within the scope of the invention as described in claims.

What is claimed is:

1. An image processing method comprising the steps of:

discriminating a color an input color image from an input color image signal;

generating a pattern signal indicating a predetermined graphic pattern corresponding to the color in accordance with the color discrimination;

generating a density signal in accordance with a density level of the discriminated color; and supplying an image forming signal based on the pattern signal and the density signal to an image forming unit so that the image forming unit may form a pattern image representing the color and density level of the input color image.

2. An image processing method according to claim 1, wherein a density level of the density signal is different from that of the input color image signal.

3. An image processing method according to claim 2, wherein a density level of the density signal is less than that of the input color image signal.

4. An image processing method according to claim 1, wherein said step of generating the density signal comprises generating the density signal which is obtained by dividing the input color image signal density level into a plurality of density levels.

5. An image processing method according to claim 1, wherein said step of generating the pattern signal comprises generating no pattern signal for non-color portion of the input color image signal.

6. An image processing method according to claim 1, wherein the image forming unit forms a monochromatic image.

7. A method according to claim 1, wherein said supplying step supplies an image forming signal derived by combining the pattern signal and the density signal.

8. An image processing apparatus comprising:

color discriminating means for discriminating a color of an input color image from an input color image signal;

pattern generator means for generating predetermined graphic patterns corresponding respectively to each color in accordance with a color discriminating signal from said color discriminating means;

density signal generating means for generating a density signal in accordance with a density level of the color discriminated by said color discriminating means; and supplying means for supplying an image forming signal based on the pattern signal generated by said pattern generator means and the density signal generated by said density signal generator means to an image forming unit so that the image forming unit may form a pattern image representing the color and density level of the input color image.

9. An image processing apparatus according to claim 8, wherein said density signal generator means generates a density signal indicating a density level lighter than that of the input color image signal.

10. An image processing apparatus according to claim 8, wherein said density signal generator means generates the density signal by dividing the input color image signal density level into a plurality of density levels.

11. An image processing apparatus according to claim 10, wherein said density signal generator means converts the density level based on a frequency distribution of the input color image signal.

12. An image processing apparatus according to claim 8, wherein said pattern generator means generates no graphic pattern for any non-color portion of the input color image signal.

13. An apparatus according to claim 8, wherein said image forming unit forms a monochromatic image.

14. An apparatus according to claim 8, wherein said image forming unit is a printer.

15. An image reproduction apparatus for reading a polychromatic image and reproducing the image by generating a predetermined pattern corresponding to each color of the polychromatic image, comprising:

reader means for reading the polychromatic image;

setting means for setting predetermined patterns corresponding respectively to each color of the polychromatic image read by said reader means and setting a density in accordance with a density level of each color of the polychromatic image; and image reproduction means for reproducing an image based on the pattern and the density set by said setting means.

16. An image reproduction apparatus according to claim 15, wherein said setting means includes discrimination means for discriminating whether or not the image read by said reader means is non-color image, and selection means for selecting image read by said read means if the result provided by said discrimination means is that the image is non-color and selecting the pattern and the density if the result provided by said discrimination means is that the image is color, and wherein the setting is performed depending on the result from said selection means.

17. A apparatus according to claim 8, wherein said supplying means supplies an image informing signal derived by combining the pattern signal and the density signal.

* * * * *

UNITED STATES PATENT AND TRADEMARK OFFICE
CERTIFICATE OF CORRECTION

PATENT NO. : 5,612,792

DATED : March 18, 1997

INVENTORS : HIROYUKI ICHIKAWA, ET AL.   Page 1 of 3

It is certified that error appears in the above-identified patent and that said Letters Patent is hereby corrected as shown below:

IN THE TITLE PAGE
OTHER PUBLICATIONS:
Item [56], "Imgae" should read --Image--.

COLUMN 2

Line 2, "selecting" should read --selecting a--;
  Line 4, "they" should read --there--;
  Line 26, "as" should be deleted.

COLUMN 4

Line 6, "is" should read --are--;
  Line 12, "FIG." should read --FIGS.--;
  Line 15, "is" should read --are--;
  Line 64, "a" should read --is a--.

COLUMN 5

Line 3, "singal" should read --signal--;
  Line 54, "image and," should read --image--.

UNITED STATES PATENT AND TRADEMARK OFFICE
CERTIFICATE OF CORRECTION

PATENT NO. : 5,612,792

DATED : March 18, 1997

INVENTORS : HIROYUKI ICHIKAWA, ET AL.

It is certified that error appears in the above-identified patent and that said Letters Patent is hereby corrected as shown below:

COLUMN 8

Line 49, "$G_{OUR}122$," should read --$G_{OUT}122$,--.

COLUMN 9

Line 11, "pattern" should read --Pattern--;
   Line 17, "in the" should read --in--;
   Line 43, "10" should be deleted
   Line 54, "HIT, that" should read --HIT--;
   Line 55, "is, 1," should be deleted and "HIT, that is, 0," should read --HIT--;
   Line 56, "HIT," should read --HIT, that is, 1,--;
   Line 57, "HIT," should read --HIT, that is, 0,--.

COLUMN 10

Line 22, "pat tern" should read --pattern--;
   Line 43, "moves" should read --move--;
   Line 53, "(=10/180x25.4/400)" should read --(=$10^6$/180x25.4/00)--.

UNITED STATES PATENT AND TRADEMARK OFFICE
CERTIFICATE OF CORRECTION

PATENT NO. : 5,612,792

DATED : March 18, 1997

INVENTORS : HIROYUKI ICHIKAWA, ET AL.

Page 3 of 3

It is certified that error appears in the above-identified patent and that said Letters Patent is hereby corrected as shown below:

<u>COLUMN 11</u>

```
Line 12, "an" should read --a--;
Line 17, "intelligent" should read --intellegence--;
Line 19, "10" should be deleted.
```

<u>COLUMN 13</u>

```
Line 34, "This is, the result of" should read --The--;
Line 41, "b12" should read --ℓ₁₂--.
```

Signed and Sealed this

Twentieth Day of January, 1998

Attest:

BRUCE LEHMAN

Attesting Officer

Commissioner of Patents and Trademarks